Jan. 26, 1960 H. W. MERGLER 2,922,940
DIGITAL CONTROL SYSTEM FOR MACHINE TOOLS
Filed April 29, 1957 8 Sheets-Sheet 1

INVENTOR.
HARRY W. MERGLER
BY Hudson, Boughton
Williams, David & Hoffmann
ATTORNEYS Jan. 26, 1960 H. W. MERGLER 2,922,940
DIGITAL CONTROL SYSTEM FOR MACHINE TOOLS
Filed April 29, 1957 8 Sheets-Sheet 2
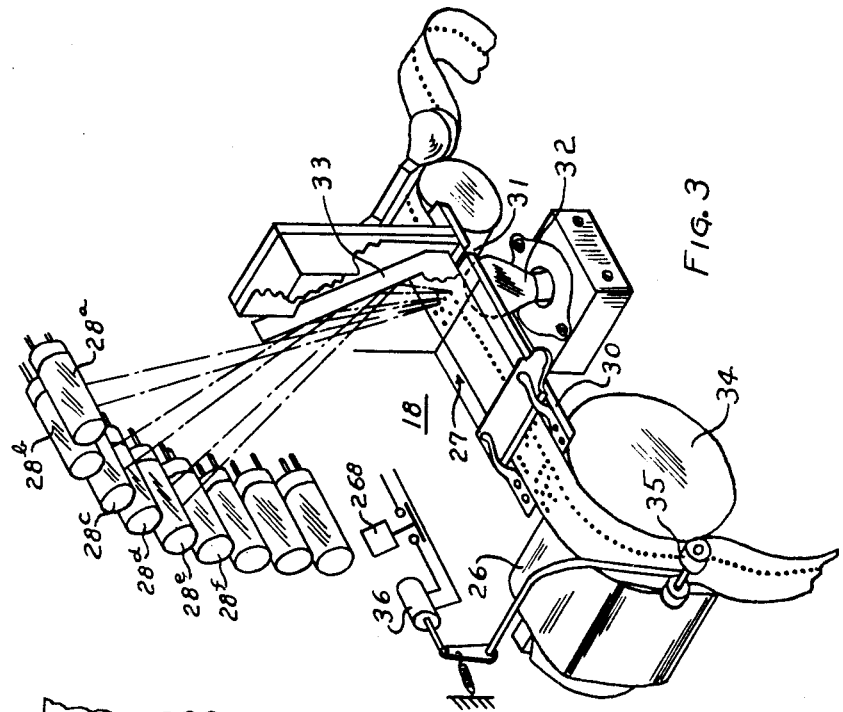
INVENTOR.
HARRY W. MERGLER
BY Hudson, Creighton,
Williams, David & Hoffman
ATTORNEYS

INVENTOR.
HARRY W. MERGLER

Jan. 26, 1960    H. W. MERGLER    2,922,940
DIGITAL CONTROL SYSTEM FOR MACHINE TOOLS
Filed April 29, 1957    8 Sheets-Sheet 4

INVENTOR.
HARRY W. MERGLER
BY
ATTORNEYS

INVENTOR.
HARRY W. MERGLER
BY Hudson, Boughton,
Williams, David & Hoffmann
ATTORNEYS Jan. 26, 1960   H. W. MERGLER   2,922,940
DIGITAL CONTROL SYSTEM FOR MACHINE TOOLS
Filed April 29, 1957   8 Sheets-Sheet 7
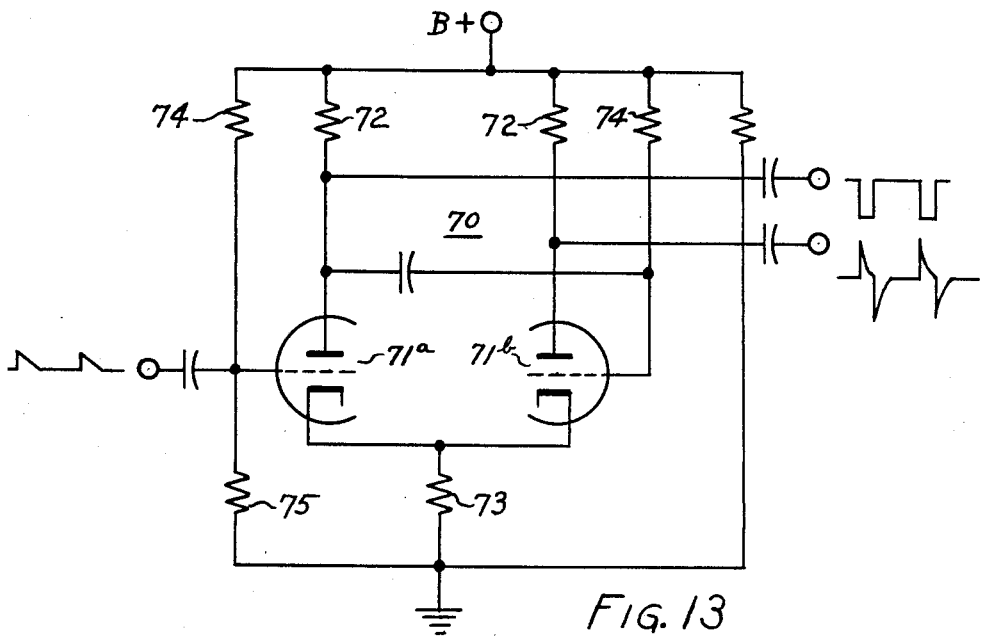
FIG. 13
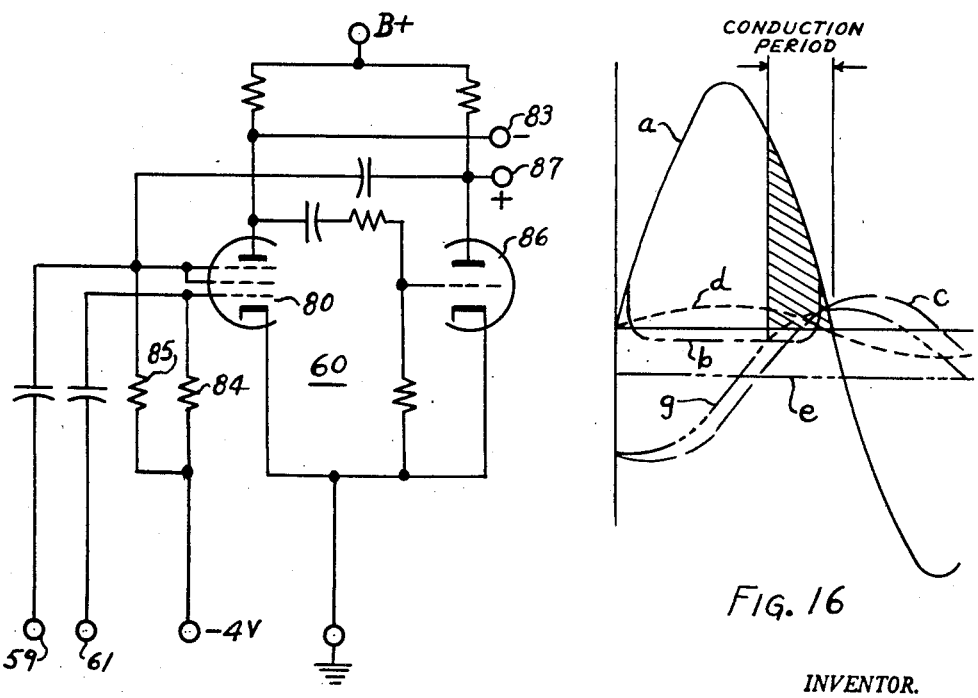
FIG. 14
FIG. 16
INVENTOR.
HARRY W. MERGLER
BY
ATTORNEYS

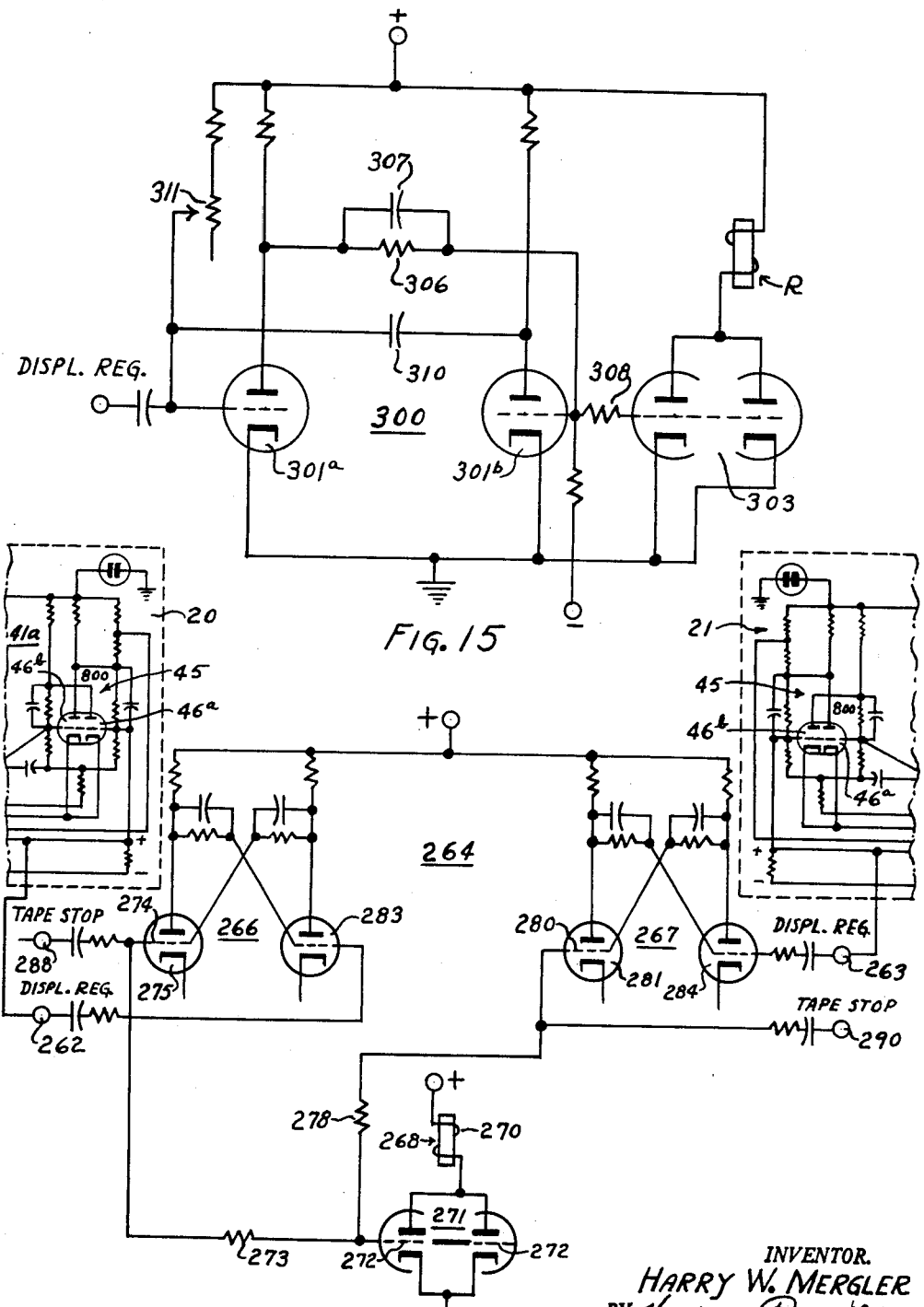

United States Patent Office 2,922,940
Patented Jan. 26, 1960

2,922,940

DIGITAL CONTROL SYSTEM FOR MACHINE TOOLS

Harry W. Mergler, Middleburgh Heights, Ohio

Application April 29, 1957, Serial No. 655,764

20 Claims. (Cl. 318—162)

The present invention relates to digital control systems and, particularly, to a digital control system for a machine tool.

There are many control systems in the prior art for effecting the operation of a machine tool in accordance with orders which are manually set into the machine or which are first encoded on a tape or record and then read into the machine, as required. The machines perform the operations in accordance with the orders without the necessity of operator invention for those specific operations which are under the control of the orders. While the systems have been satisfactory in many respects, they have been extremely bulky, complicated, and relatively expensive. In many instances the controls for the machine tool require more space than the machine tool itself and often cost considerably more than the machine tool. Furthermore, such control systems which are capable of satisfactorily controlling a machine tool within commercially acceptable tolerance limits are such that they cannot be readily applied to existing machine tool installations.

An important object, therefore, of the present invention is to provide a new and improved machine tool including a simplified digital control system for effecting the movement and positioning of one or more machine tool elements in response to orders in digital form, the system being so constructed and arranged that it is relatively simple and economic but yet is capable of controlling the element or elements within commercially acceptable tolerances and is readily adaptable to existing machine tool installations.

Another object of the present invention is to provide a new and improved digital control system for machine tools wherein orders for effecting predetermined movements of one or more machine tool elements include a rate order for controlling the rate of movement of the controlled element with the rate order being converted from digital form to analogue form to control the frequency of output pulses of a pulse generator, the output of the pulse generator being utilized to step the input element of a servo system in synchronism with the pulses to produce an error signal for actuating the controlled element and the follow-up element of the servo system.

Another object of the present invention is to provide a new and improved digital control system for a machine tool wherein orders in digital form for controlling the operation of a machine tool element controlled by the system each include a word, or number, indicative of the distance to be moved and a word, or number, indicative of the desired rate and direction of movement and wherein the rate and displacement words, or numbers, are registered in displacement and rate registers with the word in the rate register being converted by circuit means associated with the register to an analogue which controls frequency of the pulse output of a pulse generator, which pulses effect the stepping of the input element of a synchro system having a follow-up element driven by the motor for moving the controlled element and in which synchro system the relative displacement between the input element and follow-up element from a predetermined relative position where the elements are in positional agreement provides an error signal for controlling the motor for moving the controlled element and the follow-up element to effect operation thereof in a direction to reduce the error signal and to tend to maintain the follow-up element and the input element in positional agreement, the control system including means for transmitting digital information to the displacement register, which information is indicative of the distance moved by the element and when the digital information received by the displacement register corresponds to the number registered therein control operations are performed to stop the element.

A further object of the present invention is to provide a new and improved machine tool having a digital control system for a controlled element wherein a word or number indicative of the rate of movement of the element is supplied in digital form, registered, and then converted to an analogue to control the frequency of a pulse generator for providing output pulses, the frequency of which determine the rate of movement of the control element.

The present invention is shown as embodied in a lathe and as controlling the operation of the cross slide carriage and the cross slide of the lathe. In the disclosed and preferred embodiment, orders made up of words which contain information relating to the distance, direction, and rate of movement of the cross slide and cross slide carriage are punched on a tape in the sequence that the operations represented by the orders are to be performed. The control system includes displacement registers for registering the desired displacements of the cross slide and cross slide carriage and rate registers for registering the desired rate of movement to the positions indicated by the displacement registers. The orders are presented consecutively to a reading means which sets the rate registers and displacement registers in accordance with the digital information on the tape; in the preferred embodiment the information is coded in binary form on a tape with each word of the orders being comprised of bits or characters. The tape is moved past a reading device and the bits or characters of each word are read sequentially and are effective to set the storage registers through the operation of a counting type data distributor which is operated in synchronism with the reading of the bits. When a complete order has been read the tape movement is stopped until the machine executes the order. Each rate register includes circuit means for converting the digital information stored therein to an analogue potential and the analogue potentials are applied to the input of a pulse generator, preferably a relaxation type oscillator, to control the frequency of the output of the pulse generator. The output pulses from the pulse generators are applied to a resonant drive which steps, in synchronism with the output pulses, a stepping device that drives the input element of a servo system. The servo system includes, in the preferred embodiment, a follow-up element actuated by the motor for driving the controlled element, circuit means for providing an error signal dependent upon the relative displacement of the follow-up element and the input element from a predetermined relative position where the input element and follow-up element are in positional agreement, and a power servo responsive to the error signal to actuate the motor to move the follow-up element and, in turn, the cross slide or cross slide carriage, as the case may be, to reduce the error signal and to tend to maintain the follow-up element and the input element in positional agreement. As the element being controlled is moved, digital information is fed to the corresponding displacement register to indicate the distance which the element has moved. In the preferred embodiment the pulses from the pulse generators are applied to the displacement registers as well as to the stepping devices and provides feedback information for the displacement register. The displacement registers are preferably preset to the complement of the numbers representing the distance the controlled element is to be moved and the pulses from the pulse generators add a count of 1 to the count in the registers. When one of the displacement registers fills to capacity, control operations are performed to block the pulses of the corresponding pulse generator from the respective stepping device and a control is conditioned to effect movement of the tape to present a new order to the reading device. In addition to the information mentioned above, the tape includes a word which determines the direction of movement of the cross slide and cross slide carriage.

In the operation of a lathe embodying the present invention, the rates set in the rate registers for the cross slide and cross slide carriage are such that the cross slide and cross slide carriage will move the distances set on the displacement registers during the same time period. In other words, the movement of the cross slide and cross slide carriage as dictated by each order should terminate substantially at the same time. When both the cross slide and cross slide carriage have executed the order set in the registers, the tape is advanced to set a new order into the registers and the cross slide and cross slide carriage then operated to execute the following order.

Further objects and advantages of the present invention will be apparent from the following description of the preferred embodiment thereof made with reference to the accompanying drawings which form a part of this specification for all matter disclosed therein, whether or not expressly described, and in which:

Fig. 3 is a view, somewhat diagrammatic, of a photoelectric tape reader for reading a control tape having orders punched therein;

Fig. 4 is a fragmentary view of a tape showing an order for controlling the machine tool;

Fig. 13 is a circuit diagram of a monostable trigger circuit used to drive the data distributing tube of the system;

Fig. 14 shows an AND gate used with the system;

Fig. 15 is a diagram showing the electrical circuit for effecting the resetting of the control system;

Fig. 16 is a graph showing the relationship of the voltages applied to one of the thyratrons of the power servo; and Fig. 17 is a diagram of the circuit for effecting stepping of the tape and for stopping the movement of the tape at the end of an order.

The present invention is susceptible of embodiment in various mechanisms and machines where it is desirable to control the rate and the distance that an element is to be translated or rotated. It is, however, particularly suitable for use in machine tools and is herein shown and embodied, as mentioned hereinabove, in a lathe for controlling the operation of the cross slide and the cross slide carriage.

Referring to the dawing, the machine in which the digital control system is embodied comprises a bed A having ways 10 which support a cross slide carriage B for movement therealong. The ways 10 extend parallel to the axis of the work spindle, not shown, of the lathe and the carriage B is moved axially of the spindle along the ways 10 by rotation of a lead screw 12. The cross slide carriage B carries a cross slide C and supports the latter for movement transversely of the ways 10. The cross slide carriage C mounts a toolholder 14 which is adapted to support a tool for performing a machining operation on a workpiece supported and rotated by the spindle. The particular construction of the cross slide carriage B and the cross slide C does not constitute a part of the present invention and any conventional cross slide carriage and cross slide may be utilized.

Figure 1:
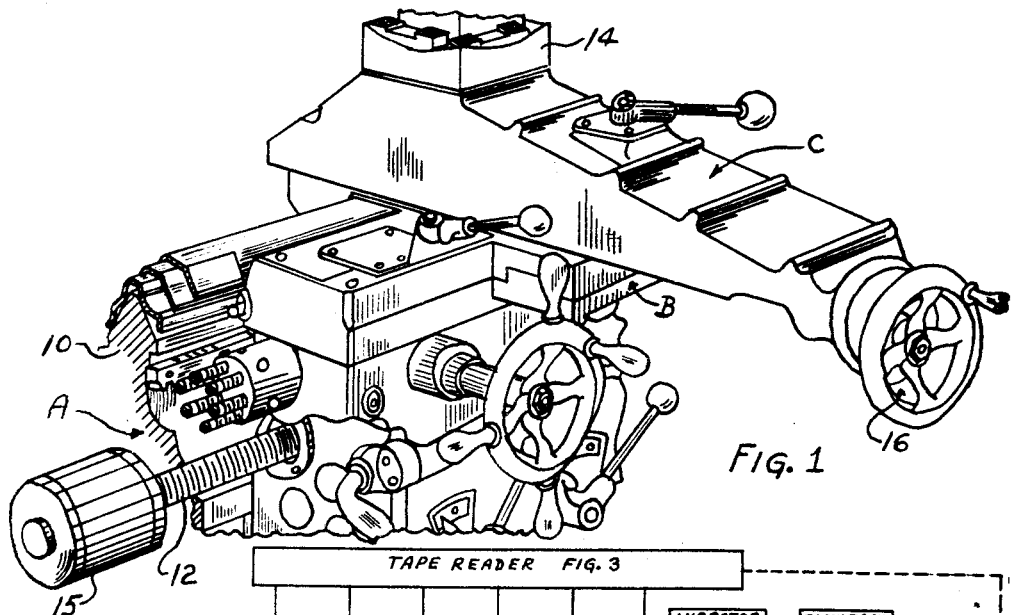
Fig. 1 is a fragmentary isometric view of a lathe embodying the present invention and showing a cross slide and a cross slide carriage which are controlled by the digital control system.
Figure 2:
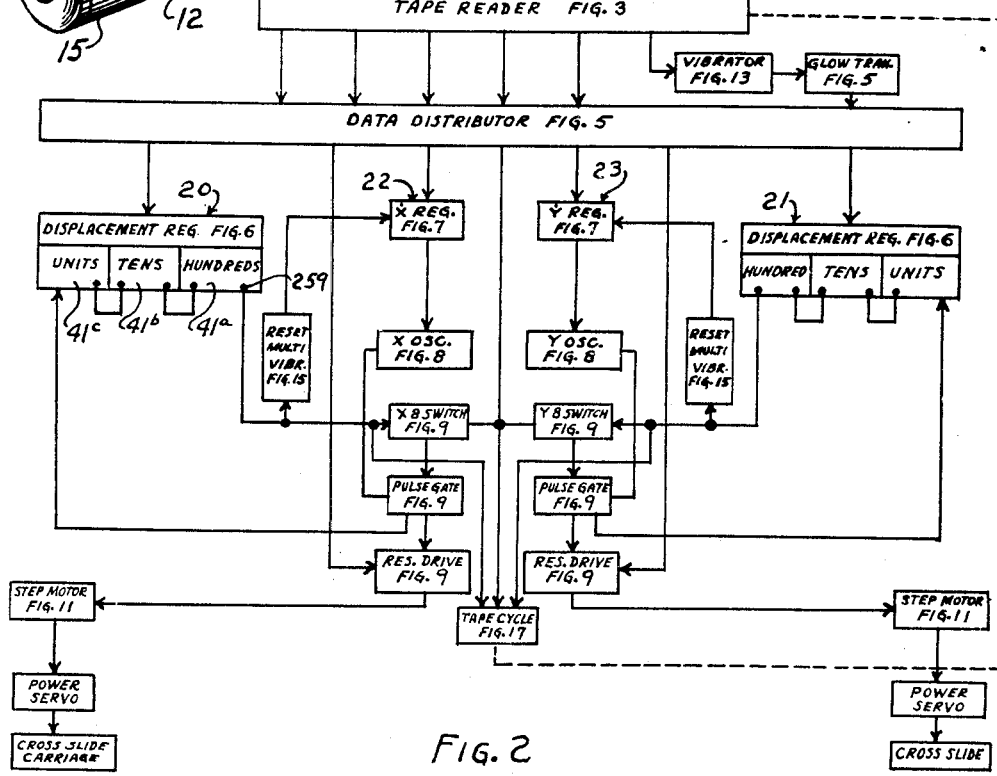
Figure 2 is a block diagram showing the various components of the digital control system for controlling the cross slide and cross slide carriage.

The present invention relates to the manner of controlling the motors for actuating the cross slide carriage and the cross slide, which motors are designated in Fig. 1 by the reference characters 15, 16 respectively. The motor 15 is connected to rotate the shaft 12 while the motor 16 is connected to rotate a lead screw rotatable supported by the cross slide C and cooperating with a nut on the cross slide carriage B to move the cross slide carriage upon rotation of the lead screw. The directions of rotation of the motors determine the directions of movements of the cross slide carriage and cross slide C. In the description of the invention the tool will be considered as moving along an X coordinate when the motor 15 is actuated to move the cross slide carriage B and as moving along a Y coordinate when the motor 16 is operated to move the cross slide and the tool transversely of the movement of the cross slide carriage B.

The movements of the cross slide carriage and cross slide are controlled, in the illustrated embodiment, by intelligence carried on a punched tape 17. The intelligence on the punched tape 17 is arranged in word groups or orders which are presented sequentially to a reading device 18. Each of the orders comprises words, or numbers, that indicate the desired displacements and the desired rates and directions of movement of the cross slide and cross slide carriage. The intelligence on the tape is in binary form and the words of the order are comprised of bits or characters which extend in rows lengthwise of the tape with the bits or characters of the various words of a single order group being arranged in columns extending transversely of the tape so that a character of each word group may be read simultaneously by a sensing mechanism extending transversely of the tape along the column line. In a binary code, each character has 2 values represented by 0 and 1 and in the present form the absence of a hole represents the 0 value and the presence of a hole represents the 1 value of the character. A single order is shown in Fig. 4, and row 1 of the single order contains 12 characters making up the word for indicating the desired displacement of the cross slide carriage and the pattern of the holes therein will determine the distance which the element controlled thereby is moved. The characters for the word indicating the desired displacement of the cross slide are in row 3 of the tape while rows 2 and 4 have therein characters of the words that indicate the rates of movement of the cross slide carriage and the cross slide respectively. The characters in the rows are arranged in columns and row 5 is provided with an opening or aperture in each column to provide a pulse for purposes which will be apparent from the following description. Row 6 is provided with an aperture in column 13 which is utilized to control tape movement. The tape is moved past the reading device 18 which reads the bits of each word thereon in sequence and when the aperture of row 6 is read, the tape movement is stopped since a complete order has then been read.

The words of each order on the tape 17 are read by the reading device 18 and output pulses from the reading device as the bits are read are utilized to set displacement registers 20, 21 for the cross slide carriage and the cross slide respectively and to set rate registers 22, 23 for determining the rate of movement of the cross slide carriage and the cross slide respectively.

The tape reading device 18 includes a motor 26 for moving the tape past a sensing station 27 and a plurality of photoelectric tubes 28a, 28b, 28c, 28d, 28e, 28f, for reading the words on the tape as they pass the station. A single photoelectric tube is provided for each word row of the tape and if there is an opening in one of the rows of the tape as it passes the sensing station a beam of light will momentarily strike the corresponding photoelectric tube. The sensing station 27 comprises a channel member 30 for guiding the tape and the channel member has a slit 31 therein which extends transversely of the tape and which will illuminate a single tape column when in registry therewith. A light source in the form of a lamp 32 is supported on the side of the channel member remote from the tape and is enclosed, the enclosing structure not being shown in the drawings, so that only a line of light illuminates the tape as it passes the slit 31. This line of light extends parallel to the columns of the tape and is adapted to illuminate the single columns as they sequentially pass the slit 31. The photoelectric tubes 28a–28f are disposed on the side of the tape 17 opposite to the channel member 30 and are respectively positioned to receive light which is transmitted through openings in the corresponding row when the particular opening registers with the slit 31.

In the illustrated embodiment, the photoelectric tubes 28a–28f are arranged in an arc extending transversely of the tape and a mirror 33 is provided to deflect the pencil of light passing through the openings in the tape 17. The illustrated arrangement permits larger photoelectric tubes to be used since the pencils of light which pass through the openings in different rows of the tape are generally parallel to each other and since the mirror which is angularly disposed to the pencils of light will reflect the light so that the pencils become cones of light that diverge from each other. The supporting structure for the photoelectric tubes is not shown or illustrated since it does not form a part of this invention and since such structure is well known to those skilled in the art. It will be noted that if miniature photoelectric tubes are utilized they can be placed immediately adjacent slit 31 to register directly the light passing through opening in the tape without first reflecting the light to form divergent cones.

The motor 26 for moving the tape 17 past the sensing station 27 drives a capstan 34, the periphery of which engages the tape 17 at the exit side of the channel member 30. The tape 17 is pressed against the periphery of the capstan 34 by pressure rollers 35 which are supported for movement toward and away from the periphery of the capstan. When the rollers 35 are pressed against the tape 17 the capstan drives the tape to move it past the slit 31 and when the pressure on the rollers 35 is released, the movement of the tape stops. The rollers 35 are pressed against the tape 17 and released by the operation of a solenoid 36 having an armature connected to the rollers 35 to actuate the latter.

It can be seen from the foregoing that the tape 17 is moved past the slit 31 and when an opening registers with the slit a pulse appears at the output of the photoelectric cell which corresponds to the row in which the opening is positioned. It can be seen, therefore, that the characters forming the words in each order group on the tape are read by moving the tape past the sensing station and the photoelectric cell corresponding to each row will be pulsed in accordance with the pattern of openings in the word appearing in the row. These pulses are utilized to set the displacement registers and the rate registers for controlling the movements of the cross slide carriage and the cross slide as well as to control the cycle of tape operation and the direction of operation of the cross slide and cross slide carriage. When an entire order is read, the aperture in row 6 produces a pulse which stops tape movement until the order is executed by the machine.

The system for controlling the cross slide is substantially a duplicate of the system for controlling the cross slide carriage and, therefore, only the system for moving the cross slide carriage along the ways 10 in response to orders on the tape 17 will be discussed and described in detail and reference will only be made to the system for controlling the cross slide where necessary to understand the manner in which the cross slide is controlled from the tape in cooperation with the control for the cross slide carriage.

The X displacement register for controlling the distance which the cross slide carriage is moved in response to an order on the punch tape 17 comprises a counting circuit of bistable trigger circuits. The displacement register 20 comprises a hundreds decade 41a, a tens decade 41b and a units decade 41c and each decade comprises four cascaded bistable trigger circuits or binary elements 42, 43, 44, 45 connected to provide a presettable scale of 10 counting circuit.

Counting circuits are primarily of two types. In one type the register or counting circuit may be preset to perform a control operation after the counting circuit achieves a predetermined count beginning with the count of 0. In the other type of counting circuit the counter is first preset to a certain number and then counts from that number until it fills to capacity at which time a control operation is performed. This latter type of counting circuit is referred to as a complementary preset counting circuit and is the type which is disclosed in the present application.

Figure 6:
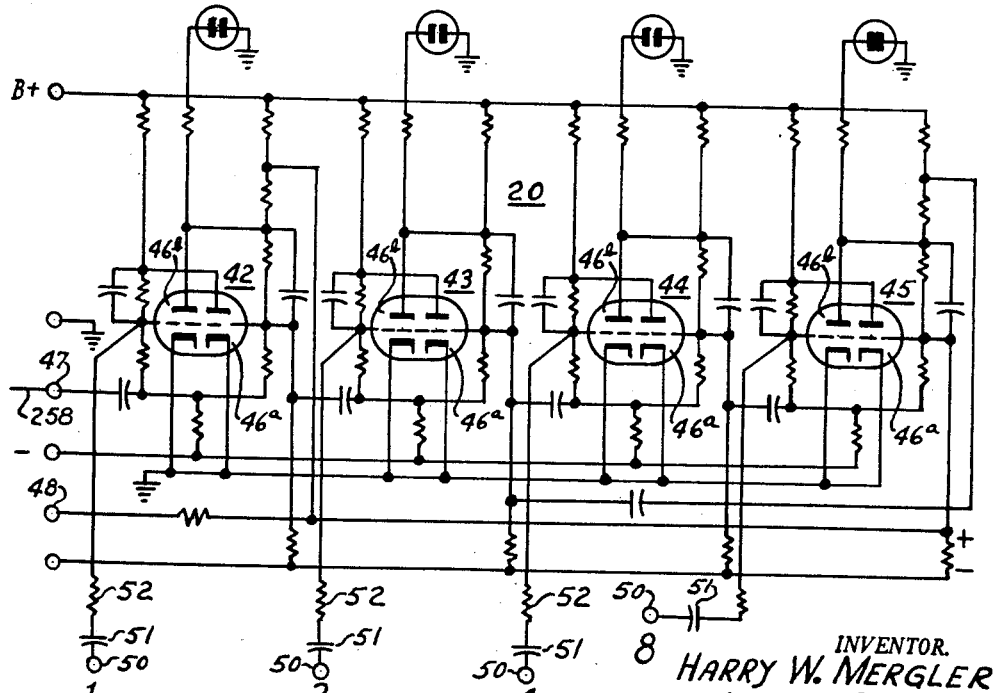
Fig. 6 is an electrical circuit diagram showing a portion of a displacement register utilized in the control system of Fig. 2.

The trigger circuits of the units decade are shown in Fig. 6 and will not be described in detail since such trigger circuits are well known to those skilled in the art. Suffice it to say that each of binary elements 42—45 comprises a pair of trigger tubes 46a, 46b, shown in Fig. 6 as enclosed in one envelope, with the grid of each of the trigger tubes 46a, 46b of the binary element being coupled to the plate of the other trigger tube by a connection including a resistor and capacitor connected in parallel. The connections of each binary element are such that only one of the tubes 46a, 46b can be conductive at any one time since the drop in plate voltage when one becomes conductive cuts off the other and prevents conduction thereof. If the trigger tube which is conductive has a negative pulse applied to the grid thereof, the tube will cut off and its plate potential will rise causing the other tube to be conductive. Thus, it can be seen that each binary element has two possible states and it will be considered that when the left-hand trigger tube, as the circuit is viewed in Fig. 6, is conducting, the binary element is in state 0 and when the right-hand trigger tube is conducting the binary element is in state 1. When the register 20 is in a condition indicating zero, all the binary elements are in state 0 with the left-hand sides thereof conducting. If a negative going pulse is now applied to an input terminal 47 of the counter, the left-hand binary element 42 will change its state so that the right-hand side thereof becomes conductive, the terminal 47 being connected to the grids of the trigger tubes 46a, 46b of the binary element 42. Therefore, when the binary element 42 is in state 1 and the other binary elements are in state 0, the counting circuit represents a count of one. The second pulse applied to the terminal 47 will turn off the trigger tube 46a of binary element and turn on the corresponding trigger tube 46b to change the binary element 42 back to state 0. The drop in potential, however, of the plate of trigger tube 46b of binary element 42 when the latter starts conducting again will supply a negative pulse to the grids of the trigger tubes of the binary element 43 to cause the latter to shift to state 1 with the trigger tube 46a thereof conducting. Therefore, when the binary elements 42, 44, 45 are in state 0 and the binary element 43 in state 1, the counting circuit represents a count of 2. The third pulse will shift the binary element 42 to state 1 without affecting the binary element 43 and the fourth pulse will shift the binary elements 42, 43 to state 0 and the binary element 44 to state 1. A further description of the counting circuit of Fig. 6 will not be given since such counting circuits are well known to those skilled in the art but reference is made to "Pulse and Digital Circuits," by Jacob Millman and Herbert Taub and published by the McGraw-Hill Book Company, Inc., for a discussion of such circuits and the operation of the counting circuit shown and partially described. Attention is directed to the fact that normally the use of four cascaded binaries would produce a scale of 16 counter. However, the binary elements of each decade of the register and counter 20 are interconnected in the manner indicated on page 330 of the book, "Pulse and Digital Circuits," to function as scale of 10 counters. Reference is also made to Patent No. 2,538,122 for a disclosure and description of a scale of 16 counting circuit of the type described which is modified to function as a scale of 10 counting circuit. When the counting circuit of the units decade receives its 10th count, the binary element 45 will be in state 1 and will change from state 1 to state 0 and an output pulse appears at a terminal 48 which is connected to the plate of the trigger tube 46a of the binary element 45. In the units decade the terminal point 48 is connected to the input terminal of the tens decade which corresponds to the input terminal 47 of the units decade and the terminal of the tens decade corresponding to the output terminal 48 of the units decade is connected to the input of the hundreds decade while the corresponding output terminal of the hundreds decade is connected to perform a control operation as set forth hereinafter.

The register or counting circuit 20 differs from that discussed in the above-mentioned "Pulse and Digital Circuits" in that provision is made for presetting the register to a selected count. It will be noted from the foregoing discussion that different counts in the register are represented by different conditions of the binaries 42—45 and that if the binary stages 42—45 are initially set in a pattern which corresponds to a certain count, the circuit will begin counting from the particular number or count for which the circuit has been preset and count until the register fills to capacity, in this case 1,000, and an output pulse appears at the output terminal of the hundreds decade. In the illustrated embodiment each grid of the trigger tubes 46b is connected to a respective terminal 50, and the particular binary element can be shifted to state 1 by applying a pulse to the respective terminal 50. The terminals 50 are each connected to their respective grids through a series connected capacitance 51 and a resistor 52. If the cross slide carriage is to be moved a certain number of units, that number is subtracted from the capacity of the register to provide the complement and the complement is set in the register by turning on certain binary elements so that the register will begin counting from the complement and will fill to capacity when the number of pulses equal to the desired units of distance have been received at the input terminal of the register.

Figure 7:
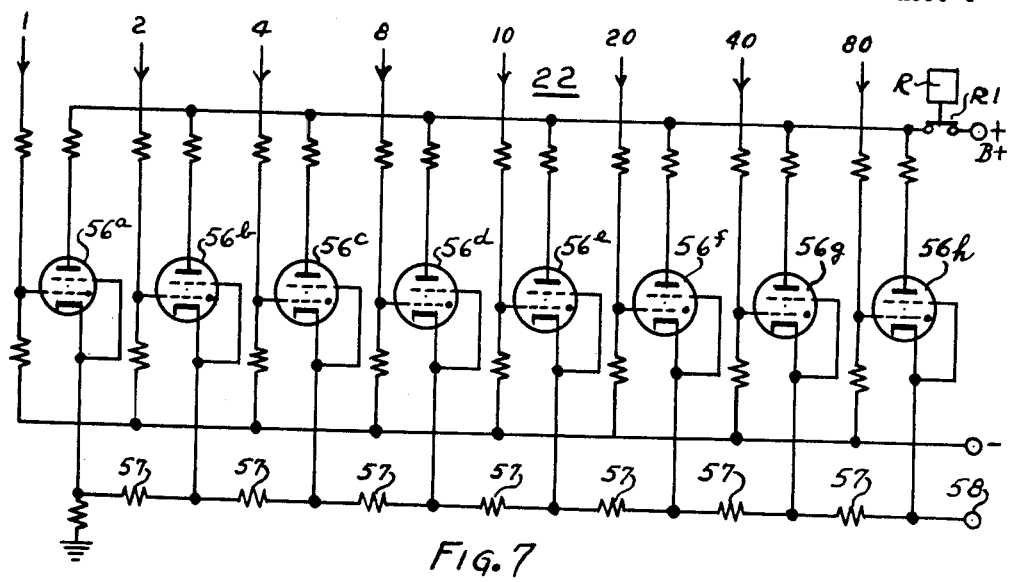
Fig. 7 is a circuit diagram of a rate register and circuit for converting the digital information in the rate register to an analogue potential.

The pulses from the reading device 18 which correspond to the characters on the tape indicative of the desired rate of movement of the cross slide carriage are utilized to set the rate register 22. The rate register 22 registers the binary number or word indicating desired rate of movement and converts the binary coded information to an analogue which is used to control a pulse generator 55, the frequency of the output pulses of which determines the rate of movement of the cross slide carriage. The rate register 22 comprises a plurality of gas-filled thyratrons 56a, 56b, 56c, 56d, 56e, 56f, 56g, 56h shown in Fig. 7. The gas-filled thyratrons 56a–56h correspond in number to the characters which constitute the word or number indicative of the rate of movement and in the illustrated machine have been designated as respectively representing the relative values 1, 2, 4, 8, 10, 20, 40, 80. The plates of the thyratrons 56a–56h are connected to a B-plus terminal of the power supply through respective plate load resistors and through a common connection including normally closed contacts R1 of a reset relay R. The cathodes of the thyratrons 56a–56h are connected to different points in a circuit comprised of a plurality of series-connected resistors 57 having one end connected to a terminal 58 and the other end connected to ground. The series-connected resistors 57 correspond in number to the number of thyratrons, the thyratrons being arranged in order of their assigned values with the cathode of each thyratron being connected to the cathode of the thyratron representing the next lower value or digit by a corresponding one of the resistors 57. The least significant digit of the thyratron has its cathode connected to ground by its corresponding resistor 57. The resistances of the resistors 57 are so related that the resistance between the point of connection of each cathode to the series circuit and ground has a predetermined relationship to the value of the digit represented by the particular thyratron with the relationship being the same for all thyratrons. In other words, the relationship of the total resistance between ground and the cathode connections of any two thyratrons is the same as the relationship of the values represented by the thyratrons. In the illustrated embodiment the consecutive resistances proceeding from the ground terminal of the series circuit have the values 1, 1, 2, 4, 2, 10, 20, and 40. The thyratrons 56a–56h are turned on in a certain pattern which corresponds to the desired rate of movement by the generally coded pulses from the reading device 18. The thyratrons 56a–56h function as constant current sources for the resistors 57 and when certain of the thyratrons are rendered conductive, the potential of the terminal 58 will represent the analogue conversion of the binary number or word registered in the rate register.

It can now be seen that the displacement registers and the rate registers are each comprised of a plurality of binary elements. The condition of the binary elements determines the binary number registered therein and to register a certain number, it is necessary to switch at least certain of the elements from their state 0, which is their initial state, to their state 1.

For every word or number which is registered in the displacement register or the rate register each binary has a certain condition. Therefore, the word on the tape 17 which is to be registered in the displacement register or the rate register has a character corresponding to each of the binaries of the registers. For example, row 1 has twelve characters which comprise the word or number to be registered in the displacement register 20, the characters appearing in columns 1–12 respectively. If an opening appears in a certain column of row 1 the light which passes therethrough will produce a pulse to set the corresponding binary in its state 1 condition. It will be noted that the first four characters in row 1 correspond to the binary elements of the units decade; the second four characters correspond to the binary elements of the tens decade and the last four characters correspond to the binary elements of the hundreds decade.

Similarly, row 2 of the tape which contains the word which is to be registered in the rate register 22 and which determines direction of movement contains a character for each of the binaries of the rate register and the presence or the absence of a hole in the corresponding column of row 2 for each of the binaries determines whether or not a pulse is transmitted to the particular binary to shift the binary to its state 1. The first 8 columns of row 2 are utilized by the characters of the word to be registered in the rate register while columns 9 and 10 are utilized to provide binary information regarding the direction of movement of the cross slide carriage as will be explained in detail hereinafter.

As the tape 17 is moved past the slit 31, the output of the photoelectric cell 28b will indicate the desired binary conditions of the binary elements of the rate register with the condition of the binaries appearing in sequence as the tape moves past the slit 31. If the binary element of the displacement register 20 corresponding to the column at the sensing station is to be in state 1 a pulse will appear at the output of the photoelectric cell 28a and if the binary element is to be in state 0, the photoelectric cell 28a will have no output. It can be seen, therefore, that if the output of the photoelectric cell 28a is sequentially connected to the terminals 50 of the binary elements of the displacement register as the characters corresponding to the binary elements pass the slit 31, the pulses, or absence of pulses, at the output of the photoelectric cell 28a will determine the condition of the binary elements.

Figure 5:
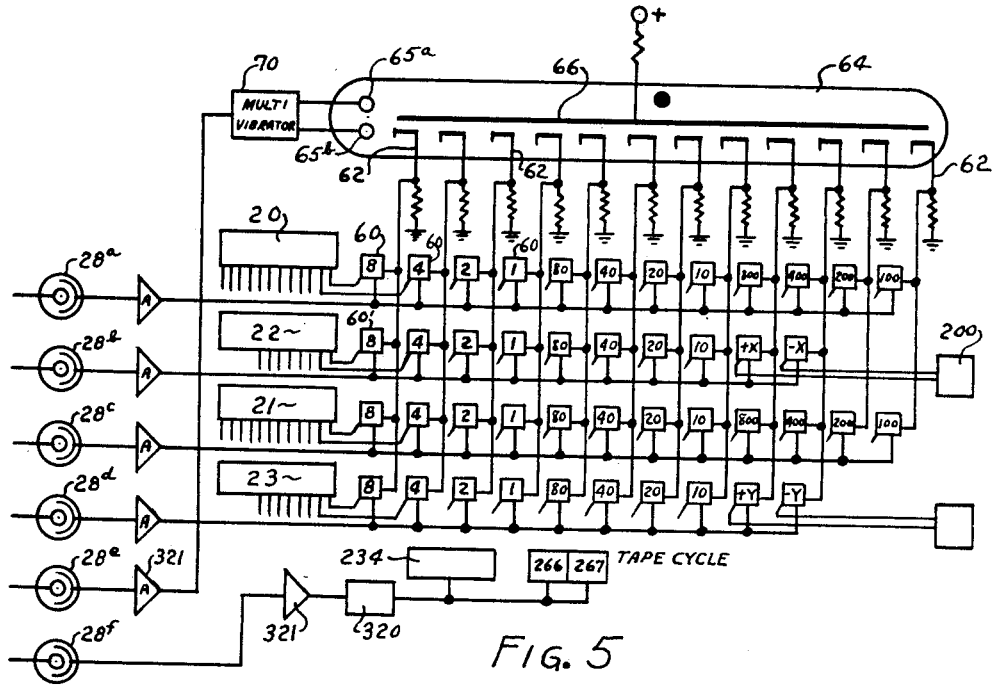
Fig. 5 is a diagram showing the circuit for distributing the information read by the tape reader to the respective registers and devices controlled by the tape.

To connect the respective binary elements to the output of the photoelectric cell 28a when the corresponding character is at the sensing station, the photoelectric cell 28a is connected to one of the inputs 59 of each of a plurality of AND circuits 60, as shown in Fig. 5. An AND circuit 60 is provided for each binary element of the displacement register 20 and the respective AND circuit 60 is connected to the corresponding terminal 50 of the displacement register so that an output pulse therefrom will change the respective binary element to state 1. The AND circuits each have a second input terminal 61 connected to a respective cathode 62 of a multi-cathode counting tube 64. The counting tube 64 is of the type having a plurality of cathodes and auxiliary electrodes or rails 65a, 65b which may be pulsed to initiate a discharge between an anode 66 and one of the cathodes. After the discharge is initiated between the anode 66 and the first cathode, subsequent pulses will cause the discharge to step from that cathode consecutively to the other cathodes and as the discharge steps along the cathodes the discharge to the preceding cathode is extinguished so that only one of the cathodes will be conducting at any given time.

The counting tube 64 may be an Ericksen GS12C low transfer counting tube having pulsing rails 65a, 65b. If pulses of a predetermined type are applied to the pulsing rails of the Ericksen low transfer tube successive pairs of pulses will serve to move the potential field through the tube structure so that conduction is transferred in unit steps to successive cathodes. The pulses and the circuit for providing the pulses are described in more detail hereinafter. The AND circuits 60 are connected to the cathodes so that as the discharge is stepped therealong in response to the pulsing of the auxiliary electrodes 65a, 65b, the AND circuits 60 will be pulsed in the order that their corresponding characters appear in row 1 of the tape.

The tape 17 has an aperture 68 in each column of row 5 which produces a pulse at the output of photoelectric cell 28e each time a column registers with the slot 31 to cause the pulsing of the auxiliary electrodes 65a, 65b. The pulse from the photoelectric cell 28e is applied to a monostable trigger circuit or multivibrator 70, the output of which is connected to the auxiliary electrodes 65a, 65b. The particular circuit which is used to effect pulsing of the auxiliary electrodes 65a, 65b in response to the output pulses at the output of photoelectric cell 28e does not, per se, form a part of the present invention and is, therefore, not shown or described in detail and any circuit providing the necessary pulses may be utilized. Referring to Fig. 13, the multivibrator 70 shown therein comprises a pair of trigger tubes 71a, 71b with the grid of the trigger tube 71b being capacitively coupled to the plate of the trigger tube 71a. The plates of the multivibrator trigger tubes 71a, 71b are connected to the positive side of the power supply through plate load resistors 72 and the cathodes are connected to ground through a cathode resistor 73. The grids of the trigger tubes 71a, 71b are also connected to the B plus terminal of the power supply through respective resistors 74 and the grid of trigger tube 71a is connected to ground through a resistor 75. The plate of trigger tube 71a is capacitively coupled to the auxiliary electrode 65a and the plate of trigger tube 71b is connected to the electrode 65b. In the circuit shown in Fig. 13, the trigger tube 71b is normally conducting and the trigger tube 71a cut off. The input pulse to the trigger circuit is applied to the grid of the trigger tube 71a and renders the latter conductive which causes a drop in the plate voltage of the tube which, in turn, effects cutting off of the trigger tube 71b. This, however, is not a stable condition since the voltage on the grid of trigger tube 71b begins to raise because its only D.C. connection is to the B-plus side of the power supply through resistor 74 and when the grid of tube 71b raises to the cut-off potential of the tube, the tube 71b will conduct and cut off the tube 71a. The disclosed trigger circuit is a cathode coupled monostable multivibrator well known to those skilled in the art and it is to be understood that other circuits can be substituted for that shown provided the outputs thereof provide the necessary wave form for stepping the discharge from one cathode to the next in the counting tube 64. In Fig. 13, the output wave forms at the output terminals are shown for each input pulse to the trigger 71a and when these output wave forms are applied to the pulsing rails or auxiliary electrodes 65a, 65b of the counting tube 64, the discharge therein will be stepped from one cathode to the next. For a complete discussion of trigger circuits such as the one disclosed reference is made to Chapter 6 of the aforementioned book by Millman and Taub.

The AND circuits or gates 60 may be of any suitable type where time coincidence is required between two inputs to transmit a pulse to the output of the gate. One such pulse gate suitable for use with the present invention is shown in Fig. 14 and comprises a gating pentode 80. Before the pentode 80 is rendered conductive simultaneous pulses must be applied to the input terminals 59, 61 and when pulses are applied simultaneously to terminals 59, 61, negative going output pulses appear at an output terminal 83 connected to the plate of the pentode 80. The input terminal 59 is connected to the screen and suppressor grids of the pentode 80 while the terminal 61 is connected to the control grid. A negative bias is also applied to the grids through a resistor 84 connected to the control grid and a resistor 85 connected to the screen and suppressor grids. The tube 80 is normally nonconductive and if simultaneous, positive pulses are applied to the terminals 59, 61 the tube will be rendered conductive and a negative pulse will appear at the output terminal 83. When the described pulse gate is utilized as one of the AND circuits 60 the negative pulse at the plate of the pentode upon time coincidence of pulses at terminals 59, 61 is applied to the presetting terminal of the corresponding binary element of the displacement register 20.

While a negative pulse is necessary to preset the binary elements of the displacement register, positive pulses are required to set the thyratrons in the rate register and to perform other functions. The gate shown in Fig. 16 may be adapted to produce positive pulses by utilizing an inverter circuit including a triode 86 having its grid capacitively coupled to the plate of the pentode 80. The plate of the triode 86 is also connected to an output terminal 87 and is capacitively coupled to the grid of the pentode 80, providing a regenerative circuit connection to the input of the pentode 80. The disclosed inverter circuit functions to invert the pulses appearing at the plate of the pentode 80 upon the time coincidence of pulses at the terminals 59, 61 and provides a positive pulse at the output terminal 87.

While a particular AND circuit has been shown and described it is to be understood that any suitable AND gate may be utilized and that many such gates are well known to those skilled in the art.

The rate register 22 is set in response to pulses which appear in a predetermined time sequence at the output of the photoelectric cell 28b in the same manner as the binary elements of the displacement register 20 are set. The output of the photoelectric cell 28b is connected to one input of a plurality of AND gates 60' which are similar to the AND gate 60 and each of the AND gates 60' has its second input terminal connected to one of the cathodes of the counting tube 64. The AND gates 60' include the pulse inverting circuit and the terminals 87 and the AND gates 60' are connected to the respective binary elements of the rate register 22. As the tape 17 moves past the sensing station 27, the characters appear in timed sequence at the output of photoelectric tube 28b and the corresponding AND gates 60' are pulsed in corresponding time sequence by the operation of the counting tube 64 to semi-activate the gate corresponding to the character appearing at the output of the photoelectric tube 28b and if a pulse is present, at the output of photoelectric tube 28b, a pulse is transmitted to the corresponding binary element to shift the same. It will be noted that the gates 60' for the last two characters of the word in row 2 are not connected to the rate register. The pulses from these gates are utilized to condition circuits for controlling the direction of movement of the cross slide carriage, as will be described in further detail hereinafter.

Figure 8:
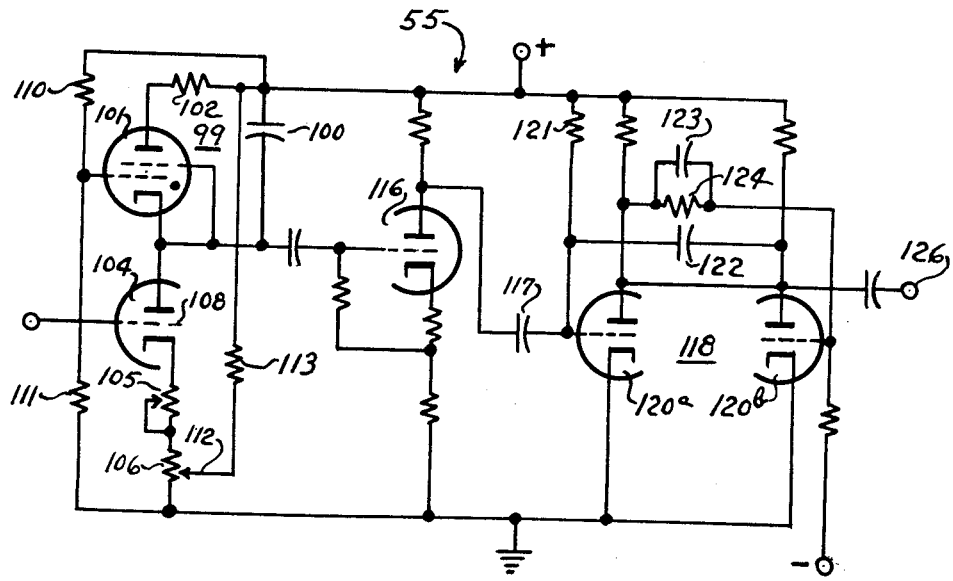
Fig. 8 is a circuit diagram of a pulse generator used in the system of Fig. 2.

The order number which is set in the rate register 22 determines frequency of output pulses from the X pulse generator 55. The pulse generator 55, as is shown in Fig. 8, includes a relaxation-type oscillating circuit 99 comprising a fixed condenser 100 and a gas discharge tube 101 connected in parallel with the condenser 100 by a circuit which includes a plate resistor 102. The plate of the gas discharge tube 101 and one side of the condenser 100 are connected to the positive side of the power supply while the cathode of the gas discharge tube and the other side of the condenser 100 are connected to ground through a grid controlled vacuum tube 104 having its plate connected to the cathode of the gas discharge tube 101 and its cathode connected to ground through a variable resistance 105 and a potentiometer resistance 106. The effective plate to cathode resistance of the vacuum tube 104, a triode in the illustrated embodiment, is controlled by its grid bias voltage and the triode functions as a variable resistance in the charging circuit for the fixed condenser 100. The charge on the condenser 100 will build up at a rate dependent upon the resistance of the tube 104 and when the charge thereon reaches the breakdown potential of the gas discharge tube 101, the tube will fire and the condenser will discharge until the potential thereof drops to the extinguishing potential of the gas discharge tube 101. When the gas discharge tube 101 fires the potential of the cathode thereof will be raised and when the tube 101 extinguishes the cathode potential will start dropping as the charge on the condenser 100 again builds up. Therefore, a positive going pulse will appear at the cathode of the gas discharge tube 101 each time the gas discharge tube fires and extinguishes itself.

The frequency of the pulses of the relaxation oscillator is determined by the effective plate to cathode resistance of the tube 104 since this determines the time constant of the circuit for charging the condenser 100. The plate to cathode resistance of the tube 104 is controlled by the bias on its control grid 108 which is connected to the output terminal 58 of the rate register for the cross slide carriage. The output frequency of the pulse generator is substantially linear for variations in the output potential at the output terminal 58.

In the disclosed relaxation oscillator the gas discharge tube 101 is a screen thyratron having the screen grid coupled to its cathode and a bias applied to its control grid by a biasing circuit including a resistor 110 connecting the control grid to the positive side of the power supply and resistor 111 connecting the control grid to ground. The potentiometer resistance 106 in the cathode circuit of the tube 104 is adjustable to adjust plate to cathode bias voltage of the triode so that with zero control voltage the plate current of the triode 104 is cut off and so that application of a positive control voltage to the grid 108 initiates conduction of the triode 104 and oscillation of the oscillating circuit 99. The potentiometer resistance 106 has a movable tap 112 connected to the positive side of the power supply through a resistance 113 and when the tap 112 is moved the bias for the tube 104 is varied.

The cathode circuit of the tube 104 also includes the variable resistance 105 which is adjustable to determine the slope of the curve of the frequency of the output pulses versus the input voltage to the relaxation oscillator and determines the maximum control voltage at maximum frequency.

The output from the relaxation-type oscillating circuit 99 is taken from the cathode of the gas discharge tube 101 and is capacitively coupled, in the illustrated embodiment, to the grid of an inverter tube 116. The inverter tube 116 is connected across the power supply and functions in a well-known manner to invert the positive going pulse appearing at the cathode of the gas discharge tube 101 to a negative going pulse, the output from the inverter tube 116 being taken from the plate of the tube 116 and capacitively coupled by a condenser 117 to the input of a monostable multivibrator circuit 118 for shaping the inverted pulse from the oscillating circuit 99.

The monostable multivibrator circuit 118 is of conventional design and comprises trigger tubes 120a, 120b, which are connected so that the circuit is stale only with the tube 120a conducting. The grid of tube 120a is connected to the positive side of the power supply through a grid resistor 121 and to the plate of the trigger tube 120b by a condenser 122. The tube 120a is normally conducting but when a negative going pulse is applied thereto the tube 120a is cut off which causes the plate voltage to rise and to render the tube 120b conductive by reason of the connection of the grid of tube 120b to the plate of the tube 120a by a circuit comprising parallel connected capacitor 123 and resistor 124. After the tube 120b starts conducting, however, the voltage on the grid of tube 120a will become increasingly positive since the only D.C. connection of the grid of tube 120a is to the positive side of the power supply through resistor 21 and the circuit will flop back to its condition with tube 120a conducting. The plate of the trigger tube 120a is capacitively coupled to an output terminal 126 and for each flip-flop of the circuit 118 a positive going pulse will appear at the output terminal 126 of the pulse generator 55.

The monostable multivibrator circuit 118 has not been shown or discussed in detail since it is a conventional circuit and reference is hereby made to chapter 6 of the above-mentioned book by Millman and Taub for a complete discussion on the operation of such circuits and for other circuits which may be utilized.

The output pulses appearing at the output terminal 126 of the pulse generator 55 are applied to a resonant drive circuit 130 for driving the servo system in synchronism with the output pulses of the pulse generator and in a direction determined by binary information coded on the tape 17 as part of the word in row 2 of the tape 17.

Figure 11:
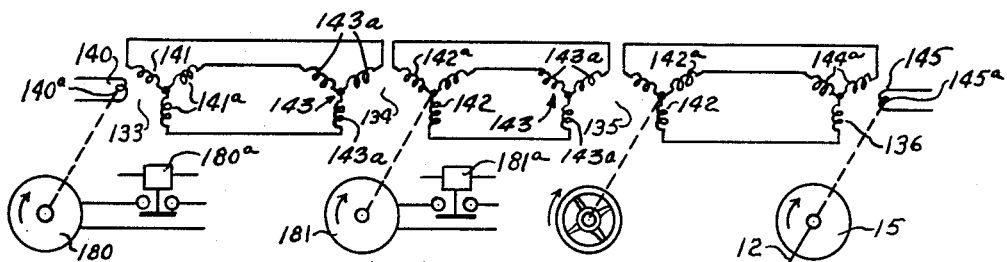
Fig. 11 is a schematic showing of the synchro system which forms a part of the servo system.

The servo system actuated by the outgoing pulses from the pulse generator 55 includes an induction synchro comprising an induction generator 133, differential generators 134, 135 and a control transformer 136, as is shown in Fig. 11.

The induction generator 133 comprises a rotor 140 and a stator 141. The rotor 140 has a single-phase coil 140a wound thereon while the stator 141 is comprised of three coils 141a Y-connected in three-phase relationship. The coil on the rotor is excited and the voltages on the output leads of stator coils vary in accordance with the relative position of the rotor and the stator and define a unique angle indicating the angular displacement of the rotor 140.

The differential generators 134, 135 are similar to the induction generator 133 and each comprises a rotor 142 and a stator 143 with three-phase stator coils 143a. The rotors 142, however, have three-phase Y-connected coils 142a thereon rather than a single-phase coil, as on the rotor 140. The stator coils 141a of the induction generator 133 are connected in three-phase relationship with the stator coils 143a of the differential generator 134 while the rotor coils 142a of the differential generator 134 are connected in three-phase relationship with the stator coils 143a of the differential generator 135. The rotor coils 142a of the generator 135 are connected in three-phase relationship with stator coils 144a of the control transformer 136. The voltages in the stator coils 144a of the control transformer 136 are dependent upon the differential of the angular displacements of the rotors of the differential transformers 134, 135 and of the induction generator 133 since the voltages on the output leads of the rotor coils 142a of differential transformer 135 define a unique angle indicating the differential of the angular displacements of the rotors 140, 142. The voltages in the stator coils 144a of the control transformer induce an A.C. error signal in the rotor coil 145a of rotor 145 of control transformer 136, the magnitude of which signal is directly proportional to the sine of the error angle of the rotor and the sense of which indicates the direction of error.

The operation of the synchro system is not explained in detail since such systems are, per se, well known to those skilled in the art and for present purposes suffice it to say that the rotor coil 145a of the control transformer 136 has a voltage induced therein whenever the rotor 140, or the rotor 142 of differential generator 134 or differential generator 135 is angularly displaced, which voltage has a sense dependent on the direction of displacement and a magnitude proportional to the magnitude of displacement. The induced voltage in rotor coil 145a is the error signal and is reduced to zero when the rotor 145 is rotated an angular amount corresponding to the original displacement of the displaced rotor.

In the illustrated machine tool, the rotor 140 of the induction generator 133 is stepped to effect movement of the cross slide carriage in the +X direction, the rotor 142 of differential transformer 134 is stepped to effect movement of the carriage in the —X direction and the rotor 142 of differential transformer 135 is manually operable in either direction to manually control the cross slide carriage. Since only one of the rotors of the induction generator and differential generators is normally actuated at any one time, the system may be considered as one where an error signal is induced in the rotor 145 indicating the positional disagreement of the rotor with a displaced input element of the synchro system.

Figure 10:
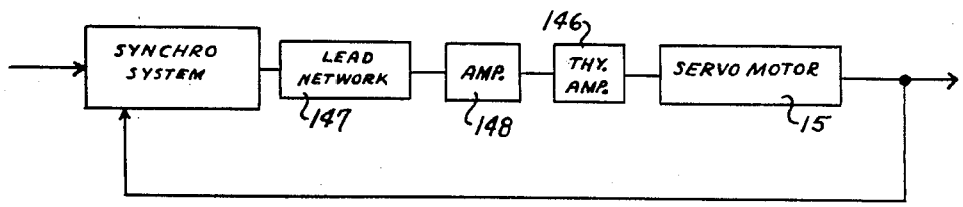
Fig. 10 is a block diagram of one of the servo systems of the control system.

The rotor 145 of the control transformer is connected to the motor 15 for moving the carriage so as to be rotated upon operation of the motor to move the carriage. The error signal appearing at the output leads of the rotor coil 145a is utilized to control a thyratron power amplifier 146 for the motor 15 and is connected to the power amplifier through a lead network 147 and an amplifier 148 as shown in Fig. 10. The error signal through the operative thyratron amplifier 146 effects operation of the motor 15 in a direction which moves the rotor 145 of the control transformer in the direction necessary to reduce the error signal.

Figure 12:
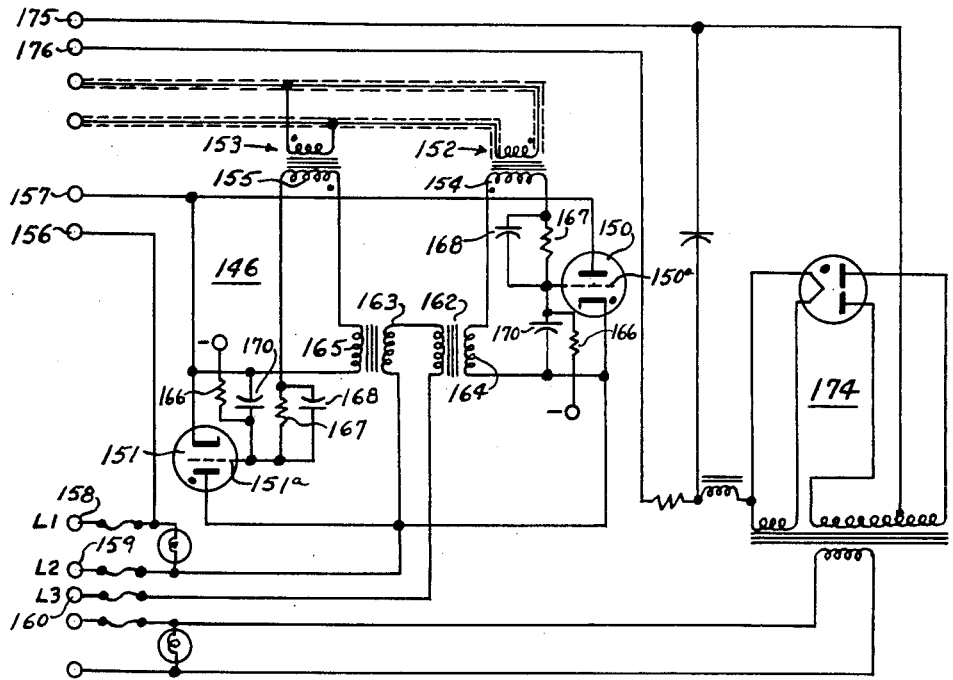
Fig. 12 is an electrical diagram of one of the thyratron amplifiers for controlling the motors for driving the cross slide carriage and the cross slide.

The thyratron amplifier 146 comprises, as is shown in Fig. 12, thyratrons 150, 151 whose conductive periods are controlled by the error signal induced in the rotor coil 145a of rotor 145 and transformers 152, 153 having primaries connected to the output of amplifier 148 and secondary coils 154, 155 respectively connected into the grid circuits of the thyratrons 150, 151 respectively.

The thyratrons 150, 151 are connected to control the current to the armature of motor 15, a D.C. motor, and the amplifier 146 has output terminals 156, 157 connected to the motor armature and power input terminals 158, 159, 160 connected to $L_1$, $L_2$ and $L_3$, respectively, of a three-phase power supply. The $L_1$ input terminal 158 is connected directly to the power output terminal 156 while the $L_2$ power input terminal 159 is connected to the output terminal 157 through the thyratrons 150, 151. The thyratrons 150, 151 are connected between the input terminal 159 and the output terminal 157 in reverse relationship so that the plate of the thyratron 150 is connected to the output terminal 157 and the plate of thyratron 151 is connected to the input terminal 159 and so that the thyratrons conduct on different half cycles. A reference voltage supply for the grid circuits of the thyratrons 150, 151 is provided by transformers 162, 163, respectively, having primary coils connected in series between power input terminals 159 and 160 and providing reference voltages at their secondary coils 164, 165 which are 120° out of phase with the voltage between $L_1$ and $L_2$.

The thyratrons 150, 151 have firing electrodes or grids 150a, 151a and for a given plate to cathode voltage of the thyratrons, the thyratrons will fire when a critical positive voltage is applied to the firing electrodes. When a varying voltage is applied between the plate and cathode of a thyratron, the critical firing voltage for causing the firing of the thyratron will vary. In the disclosed thyratron amplifier, an A.C. voltage is applied between the plate and cathode and Fig. 16 is a graph comprising a curve $a$ which indicates the plate voltage of one of the thyratrons with respect to time and a curve $b$ which indicates the critical grid voltage at which the thyratron will fire for a plate voltage varying in accordance with curve $a$. The voltages of the secondary coils 164, 165 of transformers 162, 163 are applied to the grids of the thyratrons 150, 151, respectively, to provide a reference or A.C. bias voltage indicated by curve $c$ which lags the plate voltage of the particular thyratron by 120°.

The error signals induced in the secondary coils 154, 155 of the transformers 152, 153 provide error signals in the grid circuits of the thyratrons 150, 151, one of which error signals is indicated in Fig. 16 by curve $d$. For a given sense of the error signal in coil 145a, the error signal in the grid circuit of one of the thyratrons is in phase with the plate voltage across the thyratron while the error signal in the grid circuit of the other thyratron is out of phase with the plate voltage of the thyratron.

The grid of each of the thyratrons 150, 151 is biased negatively by a respective D.C. biasing circuit including a resistor 166 as is shown in Fig. 12. The negative bias is indicated by the curve $e$ in Fig. 16. When the resultant grid voltage, indicated by curve $g$ in Fig. 16, of the error signal, the A.C. bias, and the D.C. bias of either of the thyratrons intercepts the critical grid voltage curve *b*, the thyratron will fire and will conduct until the plate voltage reverses and extinguishes the discharge.

In addition to the secondary coils of the transformers 152, 162, the grid circuit of the thyratron 150 includes a resistance 167 and a capacitor 168 connected in parallel with each other and in series with the secondary coils 154, 164. As is shown in Fig. 12, one side of the parallel connected circuit including resistor 167 and capacitor 168 is connected to the grid and the other side is returned to the grid through the secondary coil 154, the secondary coil 164 of transformer 162 and a capacitor 170 connected to the grid. The grid circuit of the thyratron 151 is similar to the grid circuit of the thyratron 150 and includes a resistor 167, a condenser 168 and a capacitor 170 connected in the manner described for the grid circuit of the thyratron 150. The capacitor 170 of each thyratron is also connected to the cathode of the thyratron as is shown in Fig. 12.

It will be noted that the control of the torque of the motor 15 is obtained by controlling the point, during the half cycle when the plate is positive, where the grid becomes more positive than its critical value. If the average current in each thyratron is equal during a single cycle, the motor does not produce torque. If one thyratron carries more current by conducting for a larger portion of the positive half cycle applied to the particular tube than for a positive half cycle applied to the other tube, the motor will operate in a corresponding direction.

In the absence of an error signal each of the thyratrons will conduct for relatively short periods of time at the end of their respective positive cycles, which periods are equal to each other. If an error signal of one sense is applied, the signal will be in phase with the plate voltage of one of the thyratrons, say thyratron 150, and out of phase with the plate voltage of the other thyratron, the thyratron 151 in the assumed case. The resultant grid voltage curve *g* for thyratron 150 will now intercept the critical grid voltage curve *b* at an earlier point in the positive cycle of the plate voltage for thyratron 150 causing the latter to conduct for a longer period. The point of firing in the positive half cycle for thyratron 150 is determined by the magnitude of the error signal. The resultant grid voltage curve of thyratron 151, however, either intercepts the critical grid voltage curve at a later point or fails to intercept the same at all and the conducting period of thyratron 151 is decreased.

If the sense of the error signal is reversed the thyratron 151 will conduct for a longer period and the polarity at the output terminals 156, 157 will reverse and the motor 15 operate in the opposite direction.

It can now be seen that the error signal controls the average current flowing in the armature of motor 15 and that the greater the error signal, the larger the armature current and the faster the motor will operate. Therefore, by moving one of the input rotors of the synchro system at a predetermined rate or frequency the motor will be caused to operate at a corresponding rate.

A full wave D.C. power supply 174 is also shown in Fig. 12 for supplying a D.C. voltage at terminals 175, 176 connected to the field of the motor 15.

Summarizing the above, when an output voltage appears in the rotor coil 145*a* of the control transformer 136 it indicates that either the rotor of the induction generator 133 or the rotor of one of the differential generators 134, 135 has been displaced and the error signal will cause current to flow in the armature of motor 15 to cause movement of the cross slide carriage. When the cross slide carriage is moved the rotor of the control transformer 136 is moved relative to the stator coil of the transformer 136 and when the rotor has reached a predetermined position corresponding to the initial displacement of the displaced rotor the voltage in the rotor coil 145*a* will be zero and the cross slide carriage stopped.

When the cross slide carriage is to be moved in one direction at a selected rate in accordance with a number registered in the rate register 22, the rotor 140 of the induction generator 133 is stepped in one direction by a stepping motor 180 and when the cross slide carriage is to be moved in the opposite direction the rotor of differential generator 134 is stepped in a direction to induce a voltage of opposite polarity in the rotor coil 145*a* by a stepping motor 181.

Figure 9:
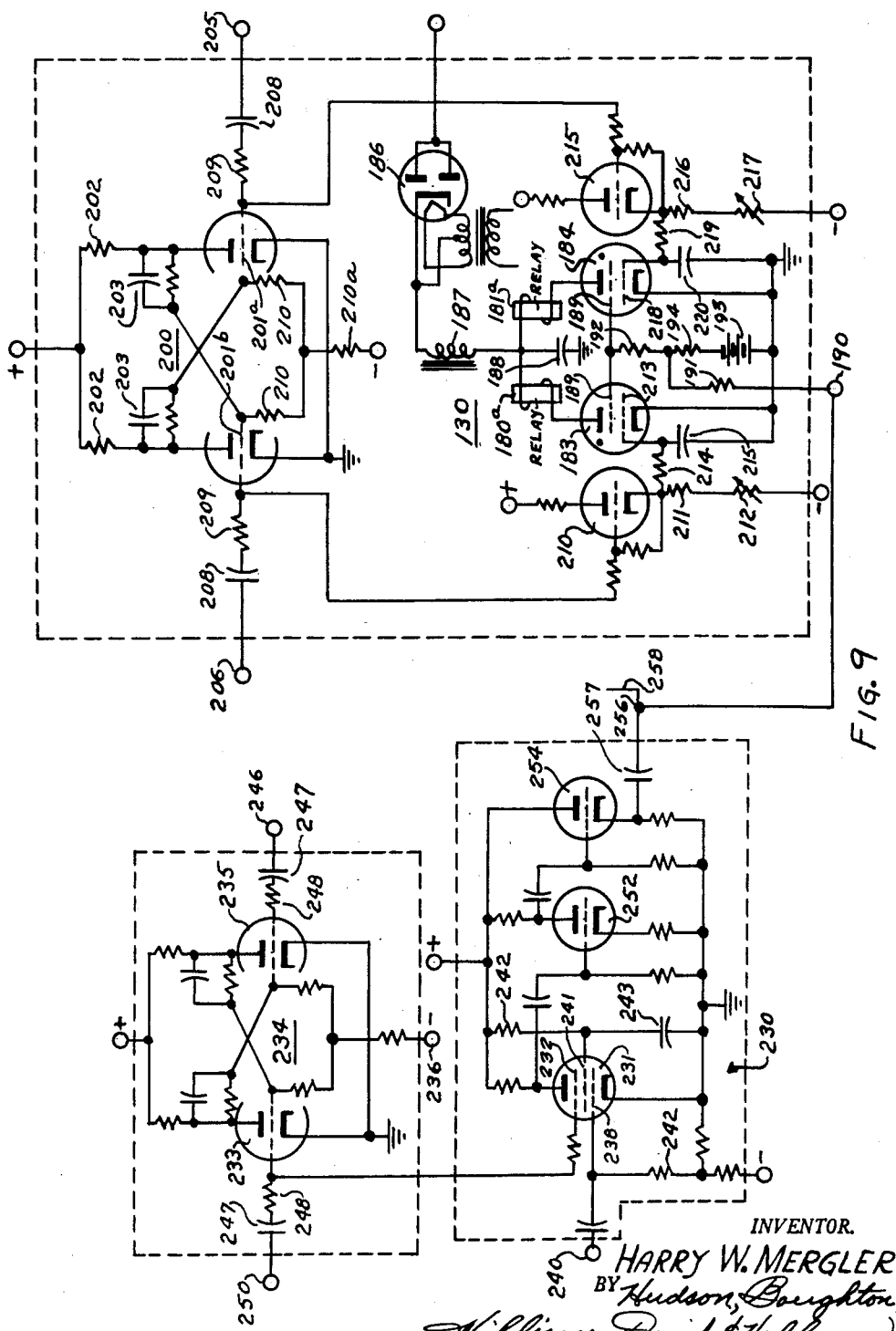
Fig. 9 is a circuit diagram of one of the directional resonant drives of the system.

Stepping motors 180, 181 are not shown structurally since they may be of conventional construction. The relays for operating the stepping motors 180, 181 are shown in Fig. 9 and are designated by the reference characters 180*a*, 181*a* respectively. Each time the relay 180*a*, 181*a* are energized the stepping motors are stepped one step and move the rotors of the induction generator 133 and of the differential generator 134 one step which corresponds to a unit of movement of the cross slide carriage.

The output pulses from the X-pulse generator 55 are utilized to pulse either the relay 180*a* or the relay 181*a* depending upon the direction of movement desired. The circuit for pulsing the relays is shown in Fig. 9 and includes a grid controlled discharge tube 183, or screen thyratron, connected in series with the relay coil of relay 180*a* and a grid controlled gas discharge tube 184, or screen thyratron, connected in series with the relay coil of the relay 181*a*. The thyratrons 183, 184 are each connected between one side of their corresponding relay coil and ground while the other sides of the relay coils are connected by a common connection to the cathode of a full wave rectifying tube 186 through an inductance 187. The common connection between the relay coils of relays 180*a*, 181*a* is connected to ground through a condenser 188 which is first charged and then discharged to pulse the relays 180*a*, 181*a*.

The tubes 183, 184 have screen grids 189 and the pulse train from the pulse generator 55 is connected to an input terminal 190 which is, in turn, connected to the screen grids of the gas discharge tubes 183, 184 through series connected resistors 191, 192. The screen grids 189 are each biased by a battery 193 connected between ground and a point between the resistors 191, 192 by a connection including biasing resistor 194. The bias supplied by the battery 193 is such that the thyratrons 183, 184 will not fire when the condenser 188 is charged to the output voltage of the rectifier tube 186. If, however, a positive going pulse is applied to the terminal 190 the grids 189 are driven sufficiently positive to cause the thyratrons to break down, provided the thyratrons are otherwise conditioned for firing, as is described hereinafter, thereby permitting the condenser 188 to discharge through the relay coils of the relays 180*a*, 181*a*.

Since only one of the stepping motors 180, 181 is to be operated at a given time, a switching circuit 200 is provided to select which of the stepping devices will be operated. The switching circuit 200 is actuatable to two different states and when in one state, only the thyratron 183 is fired by the pulses at the input terminal 190 and when in the other state, only the thyratron 184 is fired by the input pulses at the terminal 190.

As is best shown in Fig. 9, the switching circuit 200 is a bistable multivibrator circuit including trigger tubes 201*a*, 201*b*. The plates of the trigger tubes 201*a*, 201*b* are connected to the positive sides of the power supply through respective resistors 202 while the grid of each is connected to the plate of the other by a circuit 203 comprising a resistor connected in parallel with a capacitor. As mentioned hereinbefore, such bistable multivibrator circuits are well known to those skilled in the art and refereince has been made to the book, "Pulse and Digital Circuits," for a complete discussion of such circuits. Suffice it to say that in the illustrated circuit the trigger tube 201*a* or the trigger tube 201*b* is conducting at any one time and if a negative going pulse is applied to the conducting one of the tubes 201a, 201b that tube will be rendered nonconductive and the other conductive. If the tube is nonconducting when the negative pulse is applied nothing will happen.

The switching circuit 200 has two input terminals 205, 206 connected respectively to the grids of the trigger tubes 201a, 201b through respective capacitances 208 and resistors 209 connected in series. The grids of the tubes 201a, 201b are negatively biased by a respective grid biasing circuit including a resistor 210 connected to each of the grids and a common resistor 211 connecting the resistors 210 to a negative bias supply. When the thyratron 201b is conducting the grid will have a positive voltage as compared to its nonconductive state and it is this change in grid voltage with the change in the state of condition of the tube 201b which is utilized to control the operation of the thyratron 183. The grid of the trigger tube 201b is connected to the grid of a tube 210 having its cathode connected to the negative side of the power supply through cathode resistances 211, 212. The cathode of the tube 210 is also connected to a control grid 213 of the thyratron 183 by a resistor 214, the grid 213 also being connected to ground through a capacitor 215. When the trigger tube 201b is conductive the amplifying tube 210 conducts and the cathode voltage of the tube becomes more positive to bias the grid 213 of the thyratron 183 more positively. The increased bias in a positive direction applied to the grid 213 is such that the thyratron 183 will break down when a pulse from the pulse generator 55 is applied to the screen grid 189 thereof. When the trigger tube 201b is not conducting the grid thereof is more negative and the current through the tube 210 is at such a low level that the voltage applied to the grid 213 is not sufficient to render the thyratron conductive when a pulse appears on its screen grid.

Similarly, the voltage on the control grid of the trigger tube 201a is utilized to control the breakdown of thyratron 184. The control grid of the trigger grid 201a is connected to the control grid of a tube 215 having cathode resistances 216, 217 in the cathode circuit thereof. The cathode of the amplifying tube 215 is connected to a control grid 218 of the thyratron 184 by a resistor 219 and the control grid 218 is also connected to ground through a capacitor 220. When the trigger tube 201a is not conducting the bias on the control grid 218 is such as to prevent the thyratron 184 from firing.

The terminals 205, 206 of the switching circuit 200 are each connected to a respective AND gate 60' and a pulse is applied to one terminal or the other by the AND gates depending upon which column in row 2 of the tape that an opening appears. If an opening appears in column 11 a negative going pulse appears at the terminal 205 assuring that tube 201a is nonconductive and tube 201b conductive and the carriage moves in the +X direction in response to pulses from the pulse generator 55 but if the opening appears in column 12 of row 2 a negative going pulse will appear at the terminal 206 and the drive will be conditioned to move the carriage in the —X direction.

The pulses from the pulse generator 55 are not applied directly to the terminal 190 of the resonant drive but are first passed through a pulse gate 230. The pulse gate 230 is opened in response to a signal from the tape and is closed when a sufficient number of pulses have been produced to move the cross slide carriage the distance called for by the particular order.

The pulse gate 230 comprises a gating pentode 231 having its suppressor grid 232 connected to the control grid of a trigger tube 233 of a multivibrator switch 234.

The multivibrator switch 234 is a bistable multivibrator similar to the multivibrator switch 200 and a description thereof will not be repeated. Suffice it to say that in addition to the trigger tube 233 the multivibrator switch 234 includes a trigger tube 235 and that one or the other is conductive and that the grid of the trigger tube 233 assumes a negative potential by reason of a biasing potential applied at terminal 236 when the tube is nonconducting and a more positive potential, preferably zero, when the tube is conducting. When the tube 233 is nonconducting, the negative potential on the control grid thereof, which grid is connected to suppressor grid 232 of gating pentode 231, cuts off the tube 233 and renders it nonresponsive to pulses applied to control grid 238 of the pentode. The control grid 238 of gating pentode 231 is capacitively connected to a terminal 240 to which the pulses from the pulse generator 55 are applied. The control grid 238 of the pentode 231 is normally biased negatively by a biasing circuit including a resistor 242 connected between the control grid 238 and the negative side of the power supply. The screen grid 241 of pentode 231 is connected to ground by a capacitor 243. When the tube 233 is conducting a more positive potential is applied to the suppressor grid 232 of the pentode 231 and pulses applied at the terminal 240 are passed by the pentode 231.

The trigger tube 233 is rendered conductive by a negative going pulse applied to an input terminal 246 of the switching circuit 234. The input terminal 246 is connected to the grid of the trigger tube 235 through a condenser 247 and a resistor 248. When column 13 of each order reaches the sensing station 27, an opening appears in row 6 of the tape 17 which transmits light to the photocell 28f and causes a pulse to appear at the terminal 246 to render the trigger tube 233 conductive and to open the gate provided by the pentode 231 to pass the pulses. The gate is closed to block pulses from the pulse generator by a negative going pulse applied to a terminal 250 connected to the grid of the trigger tube 235 of the switching circuit 234 to cause the tube 235 to become conductive and the tube 233 nonconductive, in which state a negative bias is supplied to the suppressor grid 232 to cut off the gating pentode 231. The negative going pulse for closing the gate is obtained from the displacement register 20.

The output of the gating pentode 231 is taken from the plate of the pentode, the plate being capacitively coupled to the grid of an inverter tube 252 which inverts the pulse appearing at the plate of the pentode 231. The plate of the inverter tube 252 is capacitively coupled to the grid of a tube 254 of a cathode follower. The cathode of cathode follower tube 254 is connected to an output terminal 256 through a capacitor 257. The terminal 256 is connected to the input terminal 190 of the resonant drive for the stepping motor 180, 181. The output terminal 256 of the pulse gate 230 is also connected to the input terminal 31 of the displacement register 20 by a connection 258 including an inverter circuit, not shown, so that each time a pulse is applied to the resonant drive circuit 130 a pulse is also applied to the input terminal 47 of the displacement register 20 to register a count of one therein.

It can now be seen that the number of pulses of the output of pulse gate 230 indicate the steps that the cross slide carriage is moved by the system and that the counting circuit will count the steps of movement of the cross slide carriage. When the displacement register 20 fills to capacity an output signal appears at an output terminal 259 of the hundreds decade which is applied to the terminal 250 of the switching circuit 234 to close the pulse gate 230 to block the pulses to the motor 180 and stop the movement of the carriage. The output terminal of the hundreds decade corresponds to the output terminal 32 of the units decade shown in Fig. 6, and, as is shown in Fig. 17, is connected directly to the grid of tube 46a of binary 45 of the hundreds decade 41a.

The X pulse gate 230 has been described as controlled by a pulse appearing at the output terminal 259 of the hundreds decade of the displacement register 20. It is to be understood that the portion of the system for controlling the cross slide includes a Y-pulse gate closed by an output pulse which appears at an output terminal 259 of the hundreds decade of Y displacement register 21.

The output terminals 259 of the hundreds decade of the X and Y displacement registers 20, 21 are also connected to terminals 262, 263, respectively, of a tape cycle control circuit 264 which comprises bistable multivibrator switching circuits 266, 267 and a relay 268 energizable to complete a circuit for energizing solenoid 36 to effect tape movement. The relay 268 comprises a relay coil 270 having one side connected to the positive side of a power supply and the other side connected to ground through a double amplifying triode 271 having interconnected control grids 272. The control grids 272 are connected, by a resistor 273, to a grid 274 of a trigger tube 275 of the bistable multivibrator switching circuit 266, and also, by a resistor 278, to the grid 280 of a trigger tube 281 of the bistable multivibrator switching circuit 267. The switching circuits 266, 267 are similar to the above-described switching circuit 200 and, therefore, will not again be described. Suffice it to say that the grids 274, 280 are at either one of two voltage levels depending upon whether the corresponding one of the tubes 275, 281 is conductive or nonconductive and that in addition to the trigger tubes 275, 281 the switching circuits 266, 267 respectively include trigger tubes 283, 284 having their grids coupled to the plates of the corresponding one of trigger tubes 275, 281. The grids 274, 280 of trigger tubes 275, 281 are similarly coupled to the plates of trigger tubes 283, 284 respectively.

The trigger switches 266, 267 are controlled by output pulses from the displacement registers 20, 21 when the latter fill to capacity and by pulses from the photoelectric tube 28f which is responsive to the stop opening in the tape 17. The pulses from the X and Y displacement registers 20, 21 are respectively applied to the terminals 262, 263, connected to the grid of tubes 283, 284 respectively while the pulse from the photoelectric tube 28f is applied to input terminals 288, 290 respectively coupled to the grids of trigger tubes 275, 281. A pulse from the X displacement register cuts off the trigger tube 283 and renders the trigger tube 275 conducting while a stop pulse cuts off the trigger tube 275 and renders the trigger tube 283 conducting. Similarly, the trigger tube 281 of switching circuit 267 is rendered conducting in response to a pulse from the Y displacement register and the trigger tube 284 is rendered conducting by a stop pulse applied to terminal 290. When both of the trigger tubes 275, 281 are conducting, it signifies that both the X and Y movements are completed and the bias on the grid 272 of the double triode 271 is such that the relay 268 picks up to energize the solenoid 36 to effect movement of the tape past the sensing station 27 and to present a new order to the reading device. When the tape has again moved to a position where column 13 of the new order is at the slit 31, the opening in the column 13 produces a pulse in the output of photoelectric cell 28f which is applied to the trigger tubes 275, 281 to cause the state of the trigger circuits 266, 267 to shift so that the tubes 275, 281 are no longer conducting and the bias on the grids 275, 281 drops to a point where the current passed by the double triode 271 is insufficient to maintain the relay 268 in its picked-up condition. The relay 268 will then drop out to stop the tape movement.

The internal connections of the displacement registers for providing negative going output pulses at terminals 259 when the registers fill to capacity are shown in Fig. 17. Referring to Fig. 17, the output terminals 259 of the displacement registers 20, 21 are respectively connected to the trigger tube of the 800 binary element of the corresponding register which trigger tube is nonconducting when the register has a count of 999 therein and which conducts when the next pulse is received by the register to fill the register to capacity. The 800 binary elements 45 of the displacement registers are shown in Fig. 17. Each 800 binary element 45 comprises trigger tubes 46a, 46b having their plates and grids cross coupled and the corresponding output terminal 259 is connected to the plate of trigger tube 46b.

When each of the displacement registers 20, 21 fills to capacity a pulse is applied to the grid of corresponding trigger tubes 283, 284 to cause the tubes 275, 281 to conduct and to raise the voltage of their grid.

After the completion of an order of the machine tool the circuit for the cross slide carriage is in condition to receive a second order except for the X rate register 22. To reset the rate register 22 upon the completion of an order a reset multivibrator 300 is provided. The reset multivibrator 300 is a plate coupled monostable, or one-shot, multivibrator comprising trigger tubes 301a, 301b. The monostable multivibrator 300 controls the conduction of a double triode 303 in the circuit for energizing relay R which has normally closed contacts R1 in the connection for connecting the B-plus power supply to the plates of the thyratrons of the rate register 22. The thyratrons of the rate register 22 are connected to the B-plus power supply when the relay R is de-energized but when the relay is energized the circuit is broken and any thyratrons which have been rendered conductive are extinguished.

The multivibrator circuit 300 has a single stable state wherein the tube 301a is conducting. In this state the grid of the tube 301b which is connected to the plate of tube 301a by a resistor 306 and a capacitor 307 connected in parallel is at a relatively low potential. The grid of the tube 301b is connected by a resistor 308 to the grid of the double triode 303 and when the grid of the trigger tube 301b is at its relatively low potential the double triode 303 does not conduct sufficient current to energize the relay R. The grid of the trigger tube 301b is also coupled to the output terminal 259 of the displacement register 20 and when the register fills to capacity, a negative going pulse is applied to the trigger tube 301a to cut off the tube 301a and send the plate thereof positive thereby causing the trigger tube 301b to conduct. The grid of trigger tube 301a is coupled by a condenser 310 to the plate of the trigger tube 301b and to the positive terminal of the power supply by an adjustable resistance 311. The multivibrator will not remain in its condition with trigger tube 301b conducting because the only D.C. connection of the grid of the tube 301a is to the positive side of the power supply and the voltage on the grid of tube 301a will begin to rise and when it reaches the cut-off voltage the trigger tube 301a again becomes conducting and cuts off the trigger tube 301b. When the tube 301b stops conducting the relay R drops out and again connects the thyratrons to the positive side of the power supply.

The components of the system for moving the cross slide transversely of the axis of the work spindle are the same as the components for moving the cross slide carriage and are controlled by words in rows 3 and 4 of the tape 17. The characters which comprise the words in rows 3 and 4 are aligned in columns with the characters of the rows 1 and 2 and each discrete row-column data position indicates the desired condition of a corresponding binary element. The column-row data positions in row 3 correspond to the binary elements of the displacement register and each word in row 3 comprises 12 characters which are read by the photoelectric tube 28c in the same manner as the characters of row 1 are read and are effective in the same manner as the characters of row 1 to set the Y displacement register 21 in accordance with the word in row 3. Similarly, there are 10 characters which appear at corresponding column-row data positions in row 4 that determine the setting of the Y rate register and the direction of movement of the cross slide. The tape stop signal produced by the aperture in row 6 controls the opening of the pulse gate for the output pulses from the Y pulse generator and effects resetting of the Y rate register 23. The 800 binary element of the Y displacement register 21 is monitored by the switching circuit 282 and by the switching circuit corresponding to the X switching circuit 234 for closing the Y pulse gate when the displacement register 21 has filled to capacity.

The lead network 147 of the servo system is a capacitance resistance network which compensates for lag in the response of the servo to the movement of the rotors of the induction generator 133 and differential transformers 134. Such networks are discussed in U.S. Patent No. 2,496,391 to Hall.

The output pulses from the photoelectric tube 28f have been described as negative going pulses. Since the output of the tube 28f is comprised of positive pulses, an inverter circuit 320 is provided to invert the pulses after amplification by an amplifier 321.

In the illustrated embodiment, the information loops are closed by applying the output pulses from the pulse gates to the displacement registers. It will be understood, however, that the pulses may be obtained from other points in the system, such as from a commutator on the rotor of the stepping motor, or from the machine tool element controlled thereby. In the latter case means would be associated with the controlled machine tool element to provide a pulse for each unit movement thereof.

In describing the present invention, particular counting and switching circuits have been disclosed and described. It will be understood, however, that other suitable switching circuits are well known to those skilled in the art and these switching circuits, per se, do not form a part of the present invention. The particular type of displacement register could be replaced by a register which steps counting from the 0 count and is presettable to perform a control operation when the register receives a predetermined number of counts. Other suitable digital to analogue conversion circuits may be employed in the place of the rate registers 22, 23 and other forms of rate oscillators may be utilized as far as the general combination is concerned provided the output pulses have a frequency which is directly proportional to the input analogue voltage to the oscillator. While other types of digital to analogue conversion circuits and rate oscillators might be employed, the particular digital to analogue conversion circuit and pulse generator is highly satisfactory and is believed to be a new and novel feature of the present invention. Similarly, other types of distributors may be substituted for the counting tube type disclosed. Furthermore, it may be desirable in some installations to set the binary elements of the registers simultaneously rather than sequentially and suitable reading devices may be substituted for the one shown.

It can now be seen that the present invention provides a relatively simple, inexpensive, and compact digital control system for an element, particularly a machine tool element. The system is such that it may be readily adapted and applied to existing machine tool installations without major overhaul or revamping of the installations.

While the preferred embodiment of the present invention has been described in considerable detail modifications and further constructions and arrangements will occur to those skilled in the art and it is hereby my intention to cover all such modifications, constructions and arrangements which fall within the spirit and scope of the present invention.

Having thus described my invention, what I claim is:

1. A control system for moving a movable member along a coordinate to effect relative movement between a tool and work piece comprising a register, digital to analogue converting circuit means for producing an analogue output voltage having a magnitude dependent on the number registered in said register, pulse generating means responsive to said output voltage for generating output pulses at a frequency dependent on the magnitude of the output voltage, pulse responsive means responsive to said output pulses for moving said member a unit distance for each applied pulse and at a rate dependent upon the frequency of the applied pulses, a registering and counting circuit presettable to provide a control signal after receiving a predetermined number of pulses, means for applying a pulse to said counting circuit for each pulse received by said pulse responsive means, means responsive to said control signal to render said pulse generating means ineffective to pulse said pulse responsive means, and means for setting said register and said counting circuit to select the rate of movement and the total displacement of said member.

2. A control system for moving a movable member along a coordinate to effect relative movement between a tool and work piece comprising a register, digital to analogue converting circuit means for producing an analogue output voltage having a magnitude dependent on the number registered in said register, pulse generating means responsive to said output voltage for generating output pulses at a frequency dependent on the magnitude of the output voltage, pulse responsive means responsive to said output pulses for moving said member a unit distance for each applied pulse and at a rate dependent upon the frequency of the applied pulses comprising power actuated means for moving said member, a first synchro element, means responsive to the output pulses of said generator for stepping said first synchro element at the frequency of the output pulses, a second synchro element operatively connected to said power actuated means for movement thereby upon operation thereof to move said member, circuit means providing an error signal having a magnitude dependent on the displacement of the said synchro elements from a predetermined relative position where the elements are in positional agreement, and means responsive to said error signal for operating said power actuated means to tend to maintain said synchro elements in positional agreement and to reduce said error signal to zero, a registering and counting circuit presettable to provide a control signal after receiving a predetermined number of pulses, means for applying a pulse to said counting circuit for each pulse received by said pulse responsive means, means responsive to said control signal to render said pulse generating means ineffective to pulse said pulse responsive means, and means for presetting said register and said counting circuit to select the rate of movement and the total displacement of said member.

3. A control system for moving a movable member along a coordinate to effect relative movement between a tool and work piece, a register, digital to analogue converting circuit means for producing an output analogue voltage having a magnitude dependent on the number registered in said register, pulse generating means responsive to said output analogue voltage for generating output pulses at a frequency dependent on the magnitude of the output voltage, pulse responsive means for moving said member a unit distance for each applied pulse and at a rate dependent upon the frequency of the applied pulses, a registering and counting circuit presettable to provide a control signal after receiving a predetermined number of pulses, circuit means for applying said output pulses to said pulse responsive means including a gating circuit selectively conditionable to pass or block said output pulses from said pulse responsive means, means for closing said gating circuit in response to said control signal, means for applying pulses passed by said gating circuit to said counting circuit to register a count therein for each pulse, means for presetting said register and said registering and counting circuit to select the rate of movement and the total displacement of said member, and circuit means responsive to the setting of said register and said counting circuit for opening said gating means.

4. A control system for moving a movable member along a coordinate to effect relative movement between a tool and work piece comprising a register, digital to analogue converting circuit means for producing an output analogue voltage having a magnitude dependent on the number registered in said register, pulse generating means responsive to said output analogue voltage for generating output pulses at a frequency dependent on the magnitude of the output voltage, pulse responsive means for moving said member a unit distance for each applied pulse and at a rate dependent upon the frequency of the applied pulses comprising power actuated means for moving said member, a first synchro element, means responsive to the output pulses of said generator for stepping said first synchro element at the frequency of the ouput pulses, a second synchro element operatively connected to said power actuated means for movement thereby upon operation thereof to move said member, circuit means providing an error signal having a magnitude dependent on the displacement of the said synchro elements from a predetermined relative position where the synchro elements are in positional agreement, means responsive to said error signal for operating said power actuated means to tend to maintain said synchro elements in positional agreement to reduce said error signal to zero, a registering and counting circuit presettable to provide a control signal after receiving a predetermined number of pulses, circuit means for applying said output pulses to said pulse responsive means including a gating circuit selectively conditionable to pass or block said output pulses from said pulse responsive means, means for closing said gating circuit in response to said control signal, means for applying pulses passed by said gating circuit to said counting circuit to register a count therein for each pulse, means for presetting said register and said registering and counting circuit to select the rate of movement and the total displacement of said member, and circuit means responsive to the setting of said register and said counting circuit for opening said gating means.

5. A control system for moving a movable member along a coordinate to effect relative movement between a tool and work piece comprising a register, digital to analogue converting circuit means for producing an analogue output voltage having a magnitude dependent on the number registered in said register, pulse generating means responsive to said output voltage for generating output pulses at a frequency dependent on the magnitude of the output voltage, pulse responsive means responsive to said output pulses for moving said member a unit distance for each applied pulse and at a rate dependent upon the frequency of the applied pulses, a registering and counting circuit presettable to provide a control signal after receiving a predetermined number of pulses, means for applying a pulse to said counting circuit for each pulse received by said pulse responsive means, reading means for reading binary coded intelligence representing a plurality of orders to be performed one at a time and providing output pulses representing the intelligence, said orders including words indicative of the desired displacement and the rate of movement of the member, circuit means for appplying said pulses to said register and to said counting circuit to preset the latter, said reading means including means for providing a second control signal when an order has been read, and circuit means for rendering said pulse generating means effective to pulse said pulse responsive means in response to said second control signal and ineffective to pulse said pulse responsive means in response to said first control signal.

6. In a machine tool, the combination as defined in claim 5 wherein power actuated means is provided for delivering said orders to said reading means in sequence and wherein circuit means is provided for operating said power actuated means in response to said first control signal and for terminating operation of said power actuated means in response to said second control signal.

7. In a control system for moving a movable member in a predetermined manner, the combination of means providing pulse signals digitally representing a number indicative of the desired rate of movement of said movable member, means responsive to said pulse signals for registering the number and for providing an analogue voltage representative of the analogue conversion of the number, a pulse generator for providing output pulses having a frequency dependent on the magnitude of an input voltage applied to the generator, circuit means for applying the said analogue voltage to the input of said pulse generator and pulse responsive means for moving said member at a rate dependent on the frequency of said output pulses.

8. In a control system for moving a movable member in a predetermined manner, the combination of means providing pulse signals digitally representing a number indicative of the desired rate of movement of said movable member, means responsive to said pulse signals for registering the number and for providing an analogue voltage representative of the analogue conversion of the number, a pulse generator for providing output pulses having a frequency dependent on the magnitude of an input voltage applied to the generator, circuit means for applying the said analogue voltage to the input of said pulse generator, and pulse responsive means for moving said member at a rate dependent on the frequency of said output pulses comprising a power servo responsive to an error signal and including a motor operatively connected to move said movable member, a synchro system for providing said error signal and including a displaceable input element and a follow up element, means for stepping said input element in synchronism with the output pulses from said pulse generator, and means operatively connecting said follow up element to said motor for movement thereby.

9. In a control system for moving a movable member in a predetermined manner, the combination, of means providing pulse signals digitally representing a number indicative of the desired rate of movement of said movable member, means responsive to said pulse signals for registering the number and for providing an analogue voltage representative of the analogue conversion of the number, a pulse generator for providing output pulses having a frequency dependent on the magnitude of an input voltage applied to the generator, circuit means for applying the said analogue voltage to the input of said pulse generator, and pulse responsive means for moving said member at a rate dependent on the frequency of said output pulses comprising a motor operatively connected to said movable member to move the same, control means for operating said motor in response to an error signal indicative of the error in the mechanical position of said member, a synchro system for providing said error signal comprising an input element and a follow up element, a stepping device energizable to step said input element, a current conducting valve device in series with stepping device, said valve device having a breakdown potential at which the valve device is rendered conductive, a control element for determining the breakdown potential of said device, circuit means for applying said pulses to said control element to render the same conductive, and means operatively connecting said follow up element to said motor to move the follow up element in a direction to reduce the error signal upon operation of said motor in response to the error signal.

10. In a control system for controlling the rate of movement of a movable member of a machine tool, the combination of a plurality of resistors corresponding respectively to particular magnitudes and connected in series between end terminals in the order of the magnitudes represented thereby, said resistors having values related to each other in the same manner as the relationship of the magnitude represented thereby and having first ends remote from one end terminal of the series connected resistors, a plurality of constant current devices corresponding in number to said resistors and each having one side connected to the first end of a respective one of said resistors, a power supply connected to the other side of said devices and to the said one end terminal of said series connected resistors and said devices each having conductive and nonconductive states and actuatable to the conductive state by the application of a pulse thereto, means for applying pulses to said devices to render the latter conductive according to a predetermined pattern, a pulse generator including an oscillating circuit for generating output pulses having a frequency dependent on the magnitude of an input potential to the oscillating circuit means connecting the other of said terminals of said series connected resistors to the input of said oscillating circuit, power means responsive to said pulses and operable at a rate proportional to the frequency thereof, and means operatively connecting said power means to said member.

11. In a machine tool, the combination as defined in claim 10 wherein said means for applying pulses to said devices comprises means for reading a tape having binary coded characters thereon corresponding to each of said devices and indicative of the desired state of the conductive device and for providing a signal for each character having two possible voltage levels corresponding respectively to the two possible states of the binary characters, and means for distributing the signal to the corresponding one of said devices, said signal constituting a pulse at one level to render said devices conductive.

12. In a control system for controlling the rate of movement of a movable member of a machine tool, the combination of a plurality of resistors corresponding respectively to particular magnitudes and connected in series between end terminals in the order of the magnitudes represented thereby, said resistors having values related to each other in the same manner as the relationship of the magnitude represented thereby and having first ends remote from one end terminal of the series connected resistors, a plurality of constant current devices corresponding in number to said resistors and each having one side connected to the first end of a respective one of said resistors, a power supply connected to the other side of said devices and to the said one end terminal of said series connected resistors and said devices each having conductive and nonconductive states and actuatable to the conductive state by the application of a pulse thereto, means for applying pulses to said devices to render the latter conductive according to a predetermined pattern, a pulse generator including an oscillating circuit for generating output pulses having a frequency dependent on the magnitude of an input potential to the oscillating circuit, means connecting the other of said terminals of said series connected resistors to the input of said oscillating circuit, power actuated means for moving said member, a first synchro element, means responsive to the output pulses of said generator for stepping said first synchro element at the frequency of the output pulses, a second synchro element operatively connected to said power actuated means for movement thereby upon operation thereof to move said member, circuit means providing an error signal having a magnitude dependent on the displacement of the said synchro elements from a predetermined relative position where the synchro elements are in positional agreement, and means responsive to said error signal for operating said power actuated means to tend to maintain said synchro elements in positional agreement to reduce said error signal to zero.

13. In a control system for controlling a movable member of a machine tool, the combination, with a movable member to be controlled in a predetermined manner and power actuated means for moving the member, of means providing first pulse signals digitally representing a number indicative of the desired rate of movement of said movable member and second pulse signals representing the direction of movement of said member, first circuit means responsive to said first pulse signals for registering the number and for providing an analogue potential representative of the analogue conversion of the number, a pulse generator for providing output pulses having a frequency dependent on the magnitude of an input potential applied to the generator, second circuit means for applying the said analogue potential to the input of said pulse generator, a control system for said power actuated means comprising a synchro means including first and second angularly displaceable means and circuit means for providing an error signal indicative of the relative displacement of said first and second angularly displaceable means when the first and second angularly displaceable means are not in positional agreement, means operatively connecting said second angularly displaceable means to said power actuated means for movement thereby upon operation thereof, means for controlling said power actuated means in response to said error signal to operate the power actuated means in a direction to reduce the error signal, a first stepping device, energizable to step said first angularly displaceable means in one direction, a second stepping device energizable to step said first angularly displaceable means in the opposite direction to said one direction, a power source, circuit means connecting said devices in parallel across said source, first and second electronic valves respectively connected in series with said first and second stepping devices for controlling the current flow therethrough, said valves each having first and second control elements to control the breakdown potential thereof, third circuit means for applying said output pulses of said pulse generator to said first control elements to render said elements conductive, pulse actuated switching means for selectively applying a potential to either of said second control elements to prevent breakdown of the corresponding valve upon application of a pulse, and fourth circuit means for applying said second pulse signals to said switching means to actuate the latter to render a selected one of said valves responsive to said output pulse.

14. In control system for controlling a movable member of a machine tool, the combination, with a movable member to be controlled in a predetermined manner and power actuated means for moving the member, of means providing first pulse signals digitally representing a number indicative of the desired rate of movement of said movable member and second pulse signals representing the direction of movement of said member, first circuit means responsive to said first pulse signals for registering the number and for proving an analogue potential representative of the analogue conversion of the number, a pulse generator for providing output pulses having a frequency dependent on the magnitude of an input potential applied to the generator, second circuit means for applying the said analogue potential to the input of said pulse generator, a control system for said power actuated means comprising a synchro means including first and second angularly displaceable means and circuit means for providing an error signal indicative of the relative displacement of said first and second angularly displaceable means when the first and second angularly displaceable means are not in positional agreement, means operatively connecting said second angularly displaceable means to said power actuated means for movement thereby upon operation thereof, means for controlling said power actuated means in response to said error signal to operate the power actuated means in a direction to reduce the error signal, a first stepping device, energizable to step said first angularly displaceable means in one direction, a second stepping device energizable to step said first angularly displaceable means in the opposite direction to said one direction, a power source, circuit means connecting said devices in parallel across said source, first and second electronic valves respectively connected in series with said first and second stepping devices for controlling the current flow therethrough, said valves each having first and second control elements to control the breakdown potential thereof, third circuit means for applying said output pulses of said pulse generator to said first control elements to render said elements conductive, pulse actuated switching means for selectively applying a potential to either of said second control elements to prevent breakdown of the corresponding valve upon application of a pulse comprising a bistable trigger circuit having two alternatively conductive stages and circuit means connecting one stage to one of said second control elements and the other stage to the other of said control elements to apply first potentials thereto when the corresponding stages are conducting and second potentials when the corresponding stages are nonconducting, and fourth circuit means for applying said second pulse signals to said switching means to actuate the latter to render a selected one of said valves responsive to said output pulse.

15. In a drive for a machine tool element, a pulse responsive device operative to effect a unit movement of said element for each pulse applied thereto, an electric valve connected in series with said device for controlling current flow therethrough, said valve conducting upon the application of a predetermined potential thereto and ceasing to conduct when the voltage thereacross falls below an extinguishing potential for the valve and including a control element for controlling the potential at which said valve breaks down, a capacitor connected in parallel with said device and said valve, means for charging said condenser to a potential below the breakdown potential of said valve but above the extinguishing potential, variable frequency pulse generating means, and means for applying said pulses to said control element to effect the breakdown of said valve at the potential of said capacitor and the discharge of said capacitor through said device and said valve until the charge on said capacitor reaches the extinguishing potential of said valve, the period between said pulses being greater than the time required for discharging said capacitor.

16. In a drive for a machine tool element, a variable frequency pulse generator providing control pulses, a first pulse responsive device operative to effect a unit movement of the element in one direction for each pulse applied thereto, a second pulse responsive device operative to effect a unit movement in the opposite direction to said one direction for each pulse applied thereto, first and second electronic valves having breakdown potentials and extinguishing potentials and respectively connected in series with said first and second devices for controlling the current flow therethrough, a capacitor connected in parallel with said devices and the valves in series therewith, said valves each having control elements to control the breakdown potential thereof, means for charging said capacitor to a point below the breakdown potential of said valves but above the extinguishing potential, circuit means for applying said control pulses to said control elements to render said valves conductive, and circuit means for selectively applying a bias to either of said valves to prevent breakdown of the valve upon application of a pulse thereto.

17. In a drive for a machine tool element, a variable frequency pulse generator providing control pulses, a first pulse responsive device operative to effect a unit movement of the element in one direction for each pulse applied thereto, a second pulse responsive device operative to effect a unit movement in the opposite direction to said one direction for each pulse applied thereto, first and second electronic valves having breakdown potentials and extinguishing potentials and respectively connected in series with said first and second devices for controlling the current flow therethrough, a capacitor connected in parallel with said devices and the valves in series therewith, said valves each having control elements to control the breakdown potential thereof, means for charging said capacitor to a point below the breakdown potential of said valves but above the extinguishing potential, circuit means for applying said control pulses to said control elements to render said valves conductive, and circuit means for selectively applying a bias to either of said valves to prevent breakdown of the valve upon application of a pulse thereto comprising a bistable trigger circuit having two alternately conductive stages and circuit means connecting one stage to said first valve and the other stage to said second valve to apply first biasing potentials thereto when the corresponding stages are conducting and second biasing potentials when the corresponding stages are nonconducting.

18. A control system for moving a movable member along a coordinate to effect relative movement between a tool and work piece, a pulse responsive closed loop servo system operable to move the member along said coordinate a unit distance for each pulse applied thereto, pulse generating means for producing a train of pulses, a presettable pulse responsive counting circuit presettable to provide a signal after receiving a preselected number of pulses determined by the presetting thereof, transfer means connecting said train of pulses to the input of said servo system and to said counting circuit to register a count of one in the latter for each pulse applied to said servo system; said counting circuit totalizing said pulses and providing said signal when a preselected number of pulses has been received, and means responsive to said signal for terminating the application of pulses to said servo system and to said counting circuit.

19. A control system for moving a movable member along a coordinate to effect relative movement between a tool and work piece, a pulse responsive closed loop servo system operable to move the member along said coordinate a unit distance for each pulse applied thereto, pulse generating means for producing a train of pulses, a presettable pulse responsive counting circuit presettable to provide a signal after receiving a preselected number determined by the presetting thereof, transfer means connecting said train of pulses to the input of said servo system, and to said counting circuit to register a count of one in the latter for each pulse applied to said servo system; said counting circuit totalizing said pulses and providing said signal when a preselected number of pulses has been received, means responsive to said signal for terminating the application of pulses to said servo system and to said counting circuit, and means responsive to recorded intelligence for presetting said counting circuit.

20. A control system for moving a movable member along a coordinate to effect relative movement between a tool and work piece, a pulse responsive closed loop servo system operable to move the member along said coordinate a unit distance for each pulse applied thereto, pulse generating means for producing a train of pulses, a presettable pulse responsive counting circuit presettable to provide a signal after receiving a preselected number of pulses determined by the presetting thereof, transfer means connecting said train of pulses to the input of said servo system and to said counting circuit to register a count of one in the latter for each pulse applied to the input of the servo system; said counting circuit totalizing said pulses and providing said signal when a preselected number of pulses has been received, means responsive to said signal for terminating the application of pulses to said servo system and to said counting circuit, said transfer means including a gate operable to block the transmission of pulses from said pulse generating means to said counting circuit and to said servo system, and means connecting said counting circuit to said gate to effect the closing of said gate in response to said signal.

References Cited in the file of this patent

UNITED STATES PATENTS

| | | |
|---|---|---|
| 2,706,270 | Steele | Apr. 12, 1955 |
| 2,710,934 | Senn | June 14, 1955 |

OTHER REFERENCES

"Numerically Controlled Milling Machine," Servomechanism Lab. of the M.I.T., May 31, 1953.